US 11,884,584 B2

(12) United States Patent
Sato et al.

(10) Patent No.: US 11,884,584 B2
(45) Date of Patent: *Jan. 30, 2024

(54) GLASS FOR MAGNETIC RECORDING MEDIUM SUBSTRATE OR FOR GLASS SPACER FOR MAGNETIC RECORDING AND REPRODUCING

(71) Applicant: HOYA CORPORATION, Tokyo (JP)

(72) Inventors: Koichi Sato, Tokyo (JP); Kazuaki Hashimoto, Tokyo (JP)

(73) Assignee: HOYA CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/895,029

(22) Filed: Aug. 24, 2022

(65) Prior Publication Data

US 2022/0411317 A1    Dec. 29, 2022

Related U.S. Application Data

(63) Continuation of application No. 17/055,500, filed as application No. PCT/JP2019/019064 on May 14, 2019, now Pat. No. 11,447,414.

(30) Foreign Application Priority Data

May 16, 2018    (JP) ................. 2018-094428

(51) Int. Cl.
   *C03C 3/091*    (2006.01)
   *G11B 5/73*    (2006.01)
   *C03C 3/078*    (2006.01)
   *C03C 3/083*    (2006.01)
   *C03C 3/087*    (2006.01)
   *C03C 3/093*    (2006.01)
   *C03C 3/095*    (2006.01)

(52) U.S. Cl.
   CPC ............. *C03C 3/091* (2013.01); *C03C 3/078* (2013.01); *C03C 3/083* (2013.01); *C03C 3/087* (2013.01); *C03C 3/093* (2013.01); *C03C 3/095* (2013.01); *G11B 5/73921* (2019.05)

(58) Field of Classification Search
None
See application file for complete search history.

(56) References Cited

U.S. PATENT DOCUMENTS

| | | |
|---|---|---|
| 6,426,311 B1 | 7/2002 | Goto et al. |
| 8,394,516 B2 | 3/2013 | Matsumoto et al. |
| 8,840,997 B2 | 9/2014 | Koyama et al. |
| 9,016,092 B2 | 4/2015 | Hachitani et al. |
| 9,564,166 B2 | 2/2017 | Itaya et al. |
| 9,589,586 B2 | 3/2017 | Hachitani et al. |
| 10,150,691 B2 | 12/2018 | Comte et al. |
| 10,283,156 B2 | 5/2019 | Itaya et al. |
| 10,717,670 B2 | 7/2020 | Inoue et al. |
| 11,081,133 B2 * | 8/2021 | Sato ........... G11B 5/658 |
| 11,081,134 B2 | 8/2021 | Itaya et al. |
| 11,447,414 B2 * | 9/2022 | Sato ........... C03C 3/087 |
| 11,551,714 B2 * | 1/2023 | Sato ........... G11B 5/658 |
| 11,587,585 B2 | 2/2023 | Itaya et al. |
| 11,688,424 B2 * | 6/2023 | Sato ........... C03C 3/093 428/846.9 |
| 2001/0016552 A1 | 8/2001 | Goto et al. |
| 2003/0099062 A1 | 5/2003 | Kataoka et al. |
| 2006/0216552 A1 | 9/2006 | Ikenishi et al. |
| 2008/0248316 A1 | 10/2008 | Goto et al. |
| 2008/0268295 A1 | 10/2008 | Yagi |
| 2010/0167091 A1 | 7/2010 | Tachiwana et al. |
| 2011/0086241 A1 | 4/2011 | Tachitani et al. |
| 2011/0277508 A1 | 11/2011 | Osawa et al. |
| 2012/0052275 A1 | 3/2012 | Hashimoto et al. |
| 2012/0188663 A1 | 7/2012 | Isono et al. |
| 2013/0101798 A1 | 4/2013 | Hashimoto |
| 2015/0213826 A1 | 7/2015 | Itaya et al. |
| 2015/0262605 A1 | 9/2015 | Hachitani et al. |
| 2016/0225396 A1 | 8/2016 | Shimojima |
| 2017/0174556 A1 | 6/2017 | Miyabe et al. |
| 2017/0186459 A1 | 6/2017 | Itaya et al. |
| 2019/0047899 A1 | 2/2019 | Tokunaga et al. |
| 2019/0228801 A1 | 7/2019 | Itaya et al. |
| 2019/0362754 A1 | 11/2019 | Sato et al. |
| 2021/0327464 A1 | 10/2021 | Itaya et al. |
| 2021/0387896 A1 | 12/2021 | Sato et al. |

(Continued)

FOREIGN PATENT DOCUMENTS

| | | |
|---|---|---|
| CN | 101809659 A | 8/2010 |
| CN | 105517966 A | 4/2016 |
| CN | 109923083 A | 6/2019 |

(Continued)

*Primary Examiner* — Kevin M Bernatz

(74) *Attorney, Agent, or Firm* — Global IP Counselors, LLP

(57) ABSTRACT

A glass, which is a glass for a magnetic recording medium substrate or for a glass spacer for a magnetic recording and reproducing apparatus, is an amorphous oxide glass. An $SiO_2$ content ranges from 56 mol % to 80 mol %, an $Li_2O$ content ranges from 1 mol % to 10 mol %, a $B_2O_3$ content ranges from 0 mol % to 4 mol %, a $Na_2O$ content is 0 mol %, a total content of MgO and CaO (MgO+CaO) ranges from 9 mol % to 40 mol %, and the oxide glass has a specific gravity of 2.75 g/cm³ or less, a glass transition temperature of 650° C. or higher, and a Young's modulus of 90 GPa or more.

20 Claims, No Drawings

(56) References Cited

U.S. PATENT DOCUMENTS

2023/0192530 A1* 6/2023 Sato .................. G11B 5/72 360/131

FOREIGN PATENT DOCUMENTS

| | | |
|---|---|---|
| JP | 2001176056 A | 6/2001 |
| JP | 2003-063831 A | 3/2003 |
| JP | 2005-263574 A | 9/2005 |
| JP | 2005-267769 A | 9/2005 |
| JP | 2006-082983 A | 3/2006 |
| JP | 2010064921 A | 3/2010 |
| JP | 2013023420 A | 2/2013 |
| JP | 2016029010 A | 3/2016 |
| JP | 5939350 B1 | 6/2016 |
| JP | 2017120677 A | 7/2017 |
| JP | 6694074 B2 | 5/2020 |
| WO | 2014/034251 A1 | 3/2014 |
| WO | 2015033800 A1 | 3/2015 |
| WO | 2015162845 A1 | 10/2015 |
| WO | 2017115468 A1 | 7/2017 |
| WO | 2018088563 A1 | 5/2018 |

* cited by examiner

GLASS FOR MAGNETIC RECORDING MEDIUM SUBSTRATE OR FOR GLASS SPACER FOR MAGNETIC RECORDING AND REPRODUCING

CROSS-REFERENCE TO RELATED APPLICATIONS

This application is a continuation application of U.S. patent application Ser. No. 17/055,500, filed on Nov. 13, 2020, now U.S. Pat. No. 11,447,414, which is a U.S. National stage application of International Patent Application No. PCT/JP2019/019064, filed on May 14, 2019, which, in turn, claims priority to Japanese Patent Application No. 2018-094428, filed in Japan on May 16, 2018. The entire contents of U.S. patent application Ser. No. 17/055,500, International Patent Application No. PCT/JP2019/019064, and Japanese Patent Application No. 2018-094428 are hereby incorporated herein by reference.

BACKGROUND

Field of the Invention

The present invention relates to a glass fora magnetic recording medium substrate, a magnetic recording medium substrate, a magnetic recording medium, a glass spacer for a magnetic recording and reproducing apparatus, and a magnetic recording and reproducing apparatus.

Background Information

Heretofore, a substrate made from an aluminum alloy was used for a substrate for a magnetic recording medium such as a hard disk (magnetic recording medium substrate). However, as for a substrate made of an aluminum alloy, drawbacks have been pointed out such as easy deformation, insufficient smoothness of the substrate surface after polishing, and the like. Therefore, nowadays magnetic recording medium substrates made of glass are widely used (for example, see JP 2010-64921A).

SUMMARY

In a process of forming a magnetic recording layer on a magnetic recording medium substrate, film formation at a high temperature is usually performed or heat treatment at a high temperature is performed after film formation. Accordingly, a glass for a magnetic recording medium substrate is required to have high heat resistance capable of withstanding a high temperature treatment, and specifically to have a high glass transition temperature.

Furthermore, along with a reduction in the thickness of a magnetic recording medium and an increase in the recording density of a magnetic recording medium, there are also increasing requests to further reduction in warpage and deflection of a magnetic recording medium while a spindle motor is rotating, and to practical strength of a magnetic recording medium. In order to respond to these requests, it is desirable that a glass for a magnetic recording medium substrate has high rigidity, and specifically has a high Young's modulus.

As described above, it is desirable for a glass for a magnetic recording medium substrate to have high heat resistance and rigidity.

In view of this, an aspect of the present invention aims to provide a glass for a magnetic recording medium substrate excellent in heat resistance and rigidity.

An aspect of the present invention relates to a glass, which is a glass for a magnetic recording medium substrate or for a glass spacer for a magnetic recording and reproducing apparatus,
which is an amorphous oxide glass,
wherein an $SiO_2$ content ranges from 56 mol % to 80 mol %;
an $Li_2O$ content ranges from 1 mol % to 10 mol %;
a $B_2O_3$ content ranges from 0 mol % to 4 mol %;
a $Na_2O$ content is 0 mol %;
a total content of MgO and CaO (MgO+CaO) ranges from 9 mol % to 40 mol %; and
the oxide glass has a specific gravity of 2.75 $g/cm^3$ or less, a glass transition temperature of 650° C. or higher, and a Young's modulus of 90 GPa or more.

Also, an aspect of the present invention relates to a glass which is a glass for a magnetic recording medium substrate or for a glass spacer for a magnetic recording and reproducing apparatus,
which is an amorphous oxide glass,
wherein an $SiO_2$ content ranges from 56 mol % to 80 mol %;
an $Li_2O$ content is equal to or less than 10 mol %;
a $B_2O_3$ content ranges from 0 mol % to 4 mol %;
a CaO content is 0 mol %;
a total content of MgO and CaO (MgO+CaO) ranges from 9 mol % to 40 mol %; and
the oxide glass has a specific gravity of 2.75 $g/cm^3$ or less, a glass transition temperature of 650° C. or higher, and a Young's modulus of 90 GPa or more.

DETAILED DESCRIPTION OF THE EMBODIMENTS

[Glass for Magnetic Recording Medium Substrate]
Glass A and Glass B are each a glass for a magnetic recording medium substrate, which is an amorphous oxide glass that has the above-described glass composition, has a glass transition temperature of 650° C. or higher, and a Young's modulus of 90 GPa or more.

Glass A and Glass B are each an amorphous glass, and an oxide glass. Unlike crystallized glass, amorphous glass is glass that does not contain a crystal phase and exhibits a glass transition phenomenon due to an increase in temperature. Also, oxide glass is glass in which a main network-forming component is an oxide.

Hereinafter, Glass A and Glass B will be described in more detail. The matters described will be applied to both Glass A and Glass B, unless otherwise specified.

<Glass Composition>
A glass composition is denoted by a glass composition based on oxides in the present invention and in this specification. Here, a "glass composition based on oxides" means a glass composition obtained by performing conversion such that all raw glass materials are decomposed in melting and are present as oxides in the glass. The glass composition is denoted on the basis of mole (mol %, mole ratio), unless otherwise specified.

The glass composition in the present invention and this specification can be obtained by, for example, a method such as ICP-AES (Inductively Coupled Plasma-Atomic Emission Spectrometry). ICP-AES is used for quantitative analysis, and the analysis is performed for each of elements. Then, analysis values are converted into expressions based on oxides. Analysis values by means of ICP-AES may include, for example, a measurement error of approximately ±5% of an analysis value. Thus, a value based on oxide expression converted from an analysis value may also include an error of approximately ±5%.

Moreover, in the present invention and this specification, the fact that a constituent component is 0% in content, or is not contained or not introduced denotes that the constituent component is substantially not contained, and that the content of the constituent component is at approximately equal to or less than a level of impurities. "Approximately equal to or less than a level of impurities" means, for example, less than 0.01%.

The following describes the glass compositions of Glass A and Glass B.

$SiO_2$ is a network-forming component in glass, and serves to improve glass stability. Also, $SiO_2$ is a component that also contributes to improving chemical durability. The content of $SiO_2$ in Glass A and Glass B is, from the viewpoint of improving rigidity, equal to or less than 80%, preferably equal to or less than 75%, more preferably equal to or less than 70%, even more preferably equal to or less than 66%, further preferably equal to or less than 64%, still more preferably equal to or less than 63%, and yet more preferably equal to or less than 62%. Also, the content of $SiO_2$ in Glass A and Glass B is, from the viewpoint of maintaining chemical durability, equal to or more than 56%, preferably equal to or more than 57%, more preferably equal to or more than 58%, even more preferably equal to or more than 59%, and further preferably equal to or more than 60%.

$Al_2O_3$ is also a network-forming component in glass, and serves to improve heat resistance. Also, $Al_2O_3$ serves to improve chemical durability. $Al_2O_3$ is an essential component in Glass B. The content of $Al_2O_3$ in Glass A and Glass B is, from the viewpoint of improving heat resistance and chemical durability, preferably equal to or more than 5%, more preferably equal to or more than 8%, even more preferably equal to or more than 10%, further preferably equal to or more than 12%, and still more preferably equal to or more than 13%. Also, the content of $Al_2O_3$ in Glass A and Glass B is, from the viewpoint of improving glass stability, preferably equal to or less than 20%, more preferably equal to or less than 18%, even more preferably equal to or less than 17%, further preferably equal to or less than 16%, and still more preferably equal to or less than 15.5%.

The total content of $SiO_2$ and $Al_2O_3$ ($SiO_2+Al_2O_3$) in Glass A and Glass B is, from the viewpoint of maintaining chemical resistance, preferably equal to or more than 65%, more preferably equal to or more than 67%, even more preferably equal to or more than 69%, further preferably equal to or more than 70%, still more preferably equal to or more than 72%, and yet more preferably equal to or more than 74%. Also, from the viewpoint of improving rigidity, the total content of $SiO_2$ and $Al_2O_3$ ($SiO_2+Al_2O_3$) in Glass A and Glass B is preferably equal to or less than 80%, more preferably equal to or less than 78%, even more preferably equal to or less than 77%, further preferably equal to or less than 76%, and still more preferably equal to or less than 75%.

$B_2O_3$ is also a network-forming component in glass, is a component for reducing the specific gravity of glass, and is also a component for improving meltability. On the other hand, $B_2O_3$ easily volatilizes in melting to thereby easily make a glass component ratio unstable. Also, excessive introduction thereof tends to lower chemical durability. From the above, the content of 13203 in Glass A and Glass B is set to 0% to 4%. The content of $B_2O_3$ is preferably equal to or less than 3.00%, more preferably equal to or less than 2.00%, even more preferably equal to or less than 1.50%, further preferably equal to or less than 1.00%, still more preferably equal to or less than 0.50%, and yet more preferably equal to or less than 0.30%. Also, the content of $B_2O_3$ is preferably equal to or more than 0.00%, more preferably equal to or more than 0.05%, even more preferably equal to or more than 0.10%, and further preferably equal to or more than 0.15%.

Among MgO, CaO, SrO, and BaO which are alkali earth metal oxides, MgO serves to enhance the Young's modulus of glass, and to increase a thermal expansion coefficient, and for improving meltability and/or moldability of glass. A specific elastic modulus will be described later in detail. In an embodiment, MgO is an essential component. From the viewpoint of obtaining good these functions, the content of MgO in Glass A and Glass B is preferably equal to or more than 3%, more preferably equal to or more than 5%, even more preferably equal to or more than 7%, further preferably equal to or more than 8%, and still more preferably equal to or more than 9%. Also, from the viewpoint of maintaining glass stability, the content of MgO in Glass A and Glass B is preferably equal to or less than 28%, more preferably equal to or less than 25%, even more preferably equal to or less than 22%, further preferably equal to or less than 20%, still more preferably equal to or less than 18%, yet more preferably equal to or less than 16%, further more preferably equal to or less than 15%, and still further preferably equal to or less than 14%.

The content of CaO in Glass A and Glass B is equal to or more than 0%. CaO also serves to enhance the Young's modulus and the specific elastic modulus of glass, to increase a thermal expansion coefficient, and to improve the meltability and/or moldability of glass. From the viewpoint of obtaining good these functions, the content of CaO in Glass A and Glass B is preferably equal to or more than 2%, more preferably equal to or more than 3%, even more preferably equal to or more than 4%, and still more preferably equal to or more than 5%. Also, from the viewpoint of maintaining chemical durability, the content of CaO in Glass A and Glass B is preferably equal to or less than 18%, more preferably equal to or less than 15%, even more preferably equal to or less than 12%, further preferably equal to or less than 10%, still more preferably equal to or less than 8%, and yet more preferably equal to or less than 7%.

From the viewpoint of improving rigidity, the total content of MgO and CaO (MgO+CaO) in Glass A and Glass B is equal to or more than 9%, preferably equal to or more than 11%, more preferably equal to or more than 13%, even more preferably equal to or more than 15%, further preferably equal to or more than 16%, and still more preferably equal to or more than 17%. Also, from the viewpoint of glass stability, the total content of MgO and CaO (MgO+CaO) in Glass A and Glass B is equal to or less than 40%, preferably equal to or less than 35%, more preferably equal to or less than 30%, even more preferably equal to or less than 27%, further preferably equal to or less than 25%, still more preferably equal to or less than 23%, yet more preferably equal to or less than 21%, and further more preferably equal to or less than 20%.

From the viewpoint of increasing the Young's modulus and the specific elastic modulus and for improving glass stability, a mole ratio of the CaO content relative to the MgO content (CaO/MgO) in Glass A and Glass B is preferably equal to or less than 2.5, more preferably equal to or less than 2.3, even more preferably equal to or less than 2.1, further preferably equal to or less than 1.9, still more preferably equal to or less than 1.6, yet more preferably equal to or less than 1.4, further more preferably equal to or less than 1.1, and still further preferably equal to or less than 1.0. Also, the mole ratio (CaO/MgO) is equal to or more than 0, and from the viewpoint of improving glass stability, the mole ratio (CaO/MgO) is preferably equal to or more than 0.05, more preferably equal to or more than 0.100, even more preferably equal to or more than 0.120, and further preferably equal to or more than 0.150.

SrO serves to improve meltability and moldability of glass and glass stability, and serves to increase a thermal expansion coefficient. From the viewpoint of maintaining chemical durability, reducing a specific gravity and reducing raw material cost, the content of SrO in Glass A and Glass B ranges preferably from 0% to 2%. The content of SrO ranges more preferably from 0% to 1.5%, even more preferably from 0% to 1%, and still more preferably from 0% to 0.5%. In an embodiment, preferably, SrO is not contained, namely, the content of SrO is 0%.

Each of BaO and SrO is a component that raises the specific gravity of glass. From the viewpoint of reducing the specific gravity of glass, the total content of BaO and SrO (BaO+SrO) in Glass A and Glass B ranges preferably from 0% to 2%, more preferably from 0% to 1.5%, even more preferably from 0% to 1%, and still more preferably from 0% to 0.5%. In an embodiment, preferably, BaO and SrO are not contained, namely, the total content of BaO and SrO (BaO+SrO) is 0%.

BaO also serves to improve meltability and moldability of glass and glass stability, and serves to increase a thermal expansion coefficient. From the viewpoint of maintaining chemical durability, and reducing a specific gravity and raw material cost, the content of BaO in Glass A and Glass B ranges preferably from 0% to 2%, more preferably from 0% to 1.5%, even more preferably from 0% to 1.0%, and still more preferably from 0% to 0.5%. In an embodiment, preferably, BaO is not contained, namely, the content of BaO is 0%.

From the viewpoint of improving rigidity, reducing a specific gravity, raising a specific elastic modulus, and improving glass stability, a mole ratio of the BaO content relative to the total content of MgO, CaO, SrO, and BaO (BaO/(MgO+CaO+Sr)+BaO)) is preferably equal to or less than 0.1, more preferably equal to or less than 0.08, even more preferably equal to or less than 0.06, further preferably equal to or less than 0.04, still more preferably equal to or less than 0.03, yet more preferably equal to or less than 0.02, and further more preferably equal to or less than 0.01. In an embodiment, the mole ratio (BaO/(MgO+CaO+SrO+BaO)) is preferably 0.

From the viewpoint of improving glass stability, a mole ratio of the MgO content relative to the total content of MgO, CaO, SrO, and BaO (MgO/(MgO+CaO+Sr)+BaO)) is preferably equal to or less than 1, more preferably equal to or less than 0.8, and even more preferably equal to or less than 0.75. Also, from the viewpoint of increasing Young's modulus and a specific elastic modulus, and for improving glass stability, the mole ratio (MgO/(MgO+CaO+SrO+BaO)) is preferably equal to or more than 0.3, more preferably equal to or more than 0.5, even more preferably equal to or more than 0.6, and further preferably equal to or more than 0.65.

From the viewpoint of improving meltability and stability of glass, in Glass A and Glass B, the total content (MgO+CaO+SrO+BaO) in alkaline earth metal oxides is preferably equal to or more than 9%, more preferably equal to or more than 11%, even more preferably equal to or more than 13%, further preferably equal to or more than 14%, and still more preferably equal to or more than 16%. Also, from the viewpoint of maintaining chemical durability of glass, in Glass A and Glass B, the total content (MgO+CaO+SrO+BaO) in alkaline earth metal oxides is preferably equal to or less than 40%, more preferably equal to or less than 35%, even more preferably equal to or less than 30%, further preferably equal to or less than 28%, still more preferably equal to or less than 25%, yet more preferably equal to or less than 22%, further more preferably equal to or less than 21%, and still further preferably equal to or less than 20%.

Among alkali earth metal oxides, MgO is a component that serves to enhance the Young's modulus and the specific elastic modulus of glass, and is also a component that contributes to inhibiting an increase in a specific gravity. Accordingly, MgO is a very useful component for raising the Young's modulus and the specific elastic modulus of glass and for reducing the specific gravity of glass, and is effective particularly for raising the Young's modulus and reducing a specific gravity. CaO is also a component that serves to raise the Young's modulus and the specific elastic modulus of glass and that contributes to inhibiting an increase in a specific gravity, and is a component effective for increasing a thermal expansion coefficient of glass. On the other hand, SrO and BaO increase a specific gravity and raw material cost. From the above-described viewpoints, a mole ratio of the total content of MgO and CaO relative to the total content of MgO, CaO, SrO, and BaO {(MgO+CaO)/(MgO+CaO+SrO+BaO)} in Glass A and Glass B ranges preferably from 0.7 to 1. The lower limit of the mole ratio is more preferably equal to or more than 0.750, even more preferably equal to or more than 0.800, further preferably equal to or more than 0.850, still more preferably equal to or more than 0.900, yet more preferably equal to or more than 0.925, further more preferably equal to or more than 0.950, still further preferably equal to or more than 0.975, and yet further preferably equal to or more than 0.980.

Among alkaline metal oxides, $Li_2O$ is a component that strongly serves to improve meltability and moldability of glass, and that is suitable for increasing Young's modulus to thereby impart suitable rigidity to a magnetic recording medium substrate. $Li_2O$ is also a component that serves to reduce specific electrical resistance. A specific electrical resistance will be described later in detail. $Li_2O$ is also a component that increases a thermal expansion coefficient. Also, in a case where Glass A and Glass B are to be used as glass for chemical strengthening, $Li_2O$ is also a component that bears ion exchange in chemical strengthening. On the other hand, $Li_2O$ is also a component that lowers a glass transition temperature. In consideration of the above-described functions, the content of $Li_2O$ in Glass A and Glass B ranges from 1% to 10%. The lower limit of the content of $Li_2O$ is preferably equal to or more than 2%, more preferably equal to or more than 3%, even more preferably equal to or more than 4%, and further preferably equal to or more than 4.2%. Also, the upper limit of the content of $Li_2O$ is preferably equal to or less than 8%, more preferably equal to or less than 7%, even more preferably equal to or less than 6%, and further more preferably equal to or less than 5%.

From the viewpoint of inhibiting a decrease in glass transition temperature, the mole ratio of the $Li_2O$ content relative to the total content of MgO and CaO ($Li_2O$/(Mg(O)+CaO)) is preferably equal to or less than 0.4, more preferably equal to or less than 0.37, even more preferably equal to or less than 0.35, further preferably equal to or less than 0.32, and still more preferably equal to or less than 0.30. Also, from the viewpoint of improving the meltability of glass, inhibiting the generation of bubbles, and reducing a specific electrical resistance, the mole ratio ($Li_2O/(MgO+CaO)$) is preferably equal to or more than 0.03, more preferably equal to or more than 0.05, even more preferably equal to or more than 0.08, further preferably equal to or more than 0.10, still more preferably equal to or more than 0.15, yet more preferably equal to or more than 0.20, and further more preferably equal to or less than 0.21.

$Na_2O$ is a component that serves to improve the meltability and moldability of glass, increase a thermal expansion coefficient, and reduce the viscosity of glass (luring clarification to thereby facilitate bubble separation. Also, in a case where Glass A and Glass B are to be used as glass for chemical strengthening, $Na_2O$ is also a component that bears ion exchange in chemical strengthening. In consideration of the above functions, the content of $Na_2O$ in Glass A and Glass B ranges preferably from 0% to 10%, more preferably from 0% to 8%, even more preferably from 0% to 7%, further preferably from 0% to 6%, still more preferably from 0% to 5%, yet more preferably from 0% to 3%, and further more preferably from 0% to 1%.

From the viewpoint of improving rigidity, the mole ratio of the $Na_2O$ content relative to the $Li_2O$ content ($Na_2O/Li_2O$) is preferably equal to or less than 5, more preferably equal to or less than 3, even more preferably equal to or less than 2, further preferably equal to or less than 1, and still more preferably equal to or less than 0.5. In an embodiment, the mole ratio ($Na_2O/Li_2O$) may be 0.

$K_2O$ is also a component that serves to improve meltability and moldability of glass, and that increases a thermal expansion coefficient. On the other hand, excessive introduction thereof is likely to deteriorate chemical durability, particularly acid resistance, and, when the glass is used as a glass substrate, alkali elution from the substrate surface may increase and precipitated alkali may influence film properties of a magnetic recording layer and the like. In consideration of the above point, the content of $K_2O$ in Glass A and Glass 13 ranges preferably from 0% to 5%, more preferably from 0% to 3%, even more preferably from 0% to 2%, and further preferably from 0% to 1%. In an embodiment, $K_2O$ is not contained.

With regard to the $Li_2O$ content, the $Na_2$) content, and the $K_2O$ content, from the viewpoint of improving the meltability of glass, it is preferable that the sum of 4×the $Li_2O$ content, 2×the $Na_2O$ content, and the $K_2O$ content ($4Li_2O+2Na_2O+K_2O$) is equal to or more than 8%. Also, it is preferable that the above-described sum ($4Li_2O+2Na_2O+K_2O$) is equal to or more than 8% in order to reduce a specific electrical resistance. From the above-described viewpoints, the above-described sum is more preferably equal to or more than 10%, more preferably equal to or more than 12%, even more preferably equal to or more than 14%, further preferably equal to or more than 16%, still more preferably equal to or more than 17%, yet more preferably equal to or more than 17.3%, further more preferably equal to or more than 17.5%, and still further preferably equal to or more than 17.8%. Also, from the viewpoint of increasing a glass transition temperature, the sum of 4×the $Li_2O$ content, 2×the $Na_2O$ content, and the $K_2O$ content ($4Li_2O+2Na_2O+K_2O$) is preferably equal to or less than 27%, more preferably equal to or less than 25%, even more preferably equal to or less than 23%, further preferably equal to or less than 21%, still more preferably equal to or less than 20%, and yet more preferably equal to or less than 19%.

From the viewpoint of increasing a glass transition temperature, the mole ratio of the $SiO_2$ content relative to the total content of $L_2O$, $Na_2O$, and $K_2O$ ($SiO_2/(Li_2O+Na_2O+K_2O)$) is preferably equal to or more than 4, more preferably equal to or more than 6, even more preferably equal to or more than 8, further preferably equal to or more than 10, and still more preferably equal to or more than 10.5. Also, from the viewpoint of improving the meltability and rigidity of glass, the mole ratio ($SiO_2/(Li_2O+Na_2O+K_2O)$) is preferably equal to or less than 22, more preferably equal to or less than 20, even more preferably equal to or less than 17, further preferably equal to or less than 15, and still more preferably equal to or less than 14.

From the viewpoint of increasing Young's modulus and a specific elastic modulus, improving solubility, and reducing a specific electrical resistance, the mole ratio of the $Li_2O$ content relative to the total content of $Li_2O$, $Na_2O$, and $K_2O$ ($Li_2O/(Li_2O+Na_2O+K_2O)$) is preferably equal to or more than 0.10, more preferably equal to or more than 0.30, even more preferably equal to or more than 0.50, further preferably equal to or more than 0.70, still more preferably equal to or more than 0.80, yet more preferably equal to or more than 0.90, and further more preferably equal to or less than 0.95. In an embodiment, the mole ratio ($Li_2O/(Li_2O+Na_2O+K_2O)$) may be 1.

The mole ratio of the $Na_2O$ content relative to the total content of $Li_2O$, $Na_2O$, and $K_2O$ ($Na_2O/(Li_2O+Na_2O+K_2O)$) may be equal to or more than 0, and from the viewpoint of inhibiting a decrease in the Young's modulus and specific elastic modulus, the mole ratio thereof is preferably equal to or less than 5, more preferably equal to or less than 2, even more preferably equal to or less than 1, further preferably equal to or less than 0.8, and still more preferably equal to or less than 0.5.

From the viewpoint of increasing a thermal expansion coefficient, the sum of 5×the $Li_2O$ content, 3×the $Na_2O$ content, 3×the $K_2O$ content, 2×the $B_2O_3$ content, the MgO content, 2×the CaO content, 3×the SrO content, and the BaO content ($5Li_2O+3Na_2O+3K_2O+2B_2O_3+MgO+2CaO+3SrO+BaO$) is preferably equal to or more than 32%, more preferably equal to or more than 35%, even more preferably equal to or more than 38%, further preferably equal to or more than 40%, still more preferably equal to or more than 42%, and yet more preferably equal to or more than 44%. Also, from the viewpoint of increasing a glass transition temperature, the above-described sum ($5Li_2O+3Na_2O+3K_2O+2B_2O_3+MgO+2Ca(O+3SrO+BaO)$) is preferably equal to or less than 58%, more preferably equal to or less than 56%, even more preferably equal to or less than 54%, further preferably equal to or less than 52%, still more preferably equal to or less than 51%, and yet more preferably equal to or less than 50%.

From the viewpoint of improving glass stability, the mole ratio of the total content of CaO and $Na_2$) relative to the total content of MgO and $Li_2O$ ($(CaO+Na_2O)/(MgO+Li_2O)$) is preferably equal to or more than 0, more preferably equal to or more than 0.03, even more preferably equal to or more than 0.05, further preferably equal to or more than 0.10, still more preferably equal to or more than 0.15, yet more preferably equal to or more than 0.20, and further more preferably equal to or less than 0.25. Also, from the viewpoint of inhibiting a decrease in the Young's modulus and specific elastic modulus, the mole ratio ($(CaO+Na_2O)/(MgO+Li_2O)$) is preferably equal to or less than 2.5, more preferably equal to or less than 2, even more preferably equal to or less than 1.5, further preferably equal to or less than 1.0, still more preferably equal to or less than 0.8, and yet more preferably equal to or less than 0.6.

$Li_2O$, $Na_2O$, and $K_2O$ are components that improve the meltability and moldability of glass and increase a thermal expansion coefficient. From the viewpoint of obtaining good these functions, in Glass A and Glass B, the total content ($Li_2O+Na_2O+K_2O$) in alkaline metal oxides is preferably equal to or more than 2.5%, more preferably equal to or more than 3%, even more preferably equal to or more than 3.5%, and further preferably equal to or more than 4%. Also, from the viewpoint of maintaining heat resistance and chemical durability of glass, in Glass A and Glass B, the total content ($Li_2O+Na_2O+K_2O$) in alkaline metal oxides is preferably equal to or less than 10%, more preferably equal to or less than 8%, even more preferably equal to or less than 7%, further preferably equal to or less than 6%, and still more preferably equal to or less than 5%. Note that as a consequence of the fact that glass contains two or more types of alkali metal oxides, it is possible to obtain the effect of suppressing or preventing alkali elution from the glass surface through a mixed alkali effect.

$TiO_2$ serves to improve glass stability and/or chemical durability and improve rigidity, but excessive introduction thereof may raise the liquidus temperature of glass to thereby cause deterioration of devitrification resistance and/or rise of a specific gravity. Accordingly, the content of $TiO_2$ in Glass A and Glass B ranges preferably from 0% to 10%, more preferably from 0% to 8%, even more preferably from 0% to 6%, further preferably from 0% to 4%, still more preferably from 0% to 3%, yet more preferably from 0% to 2%, and further more preferably 0% to 1%.

From the viewpoint of inhibiting the generation of bubbles, improving chemical durability, and increasing the hardness of glass, a mole ratio of the total content of $TiO_2$ and $Al_2O_3$ relative to the total content of MgO and CaO (($TiO_2+Al_2O_3$)/(MgO+CaO)) is preferably equal to or more than 0.35, more preferably equal to or more than 0.400, even more preferably equal to or more than 0.440, further preferably equal to or more than 0.500, and still more preferably equal to or more than 0.640. Also, from the viewpoint of improving glass stability, raising a specific elastic modulus, and reducing a specific gravity, the mole ratio (($TiO_2+Al_2O_3$)/(MgO+CaO)) is preferably equal to or less than 2, more preferably equal to or less than 1.800, even more preferably equal to or less than 1.600, further preferably equal to or more than 1.400, still more preferably equal to or more than 1.200, and yet more preferably equal to or more than 1.000.

$ZrO_2$ serves to improve chemical durability, and also serves to improve rigidity. However, excessive introduction thereof may lower the meltability of glass to thereby produce raw material residue due to melting. Accordingly, the content of $ZrO_2$ in Glass A and Glass B ranges preferably from 0% to 5%, more preferably from 0% to 3%, even more preferably from 0% to 2%, further preferably from 0% to 1%, and still more preferably 0% to 0.5%. In an embodiment, the content of $ZrO_2$ may be 0.00%.

From the viewpoint of raising a specific elastic modulus, the sum of the MgO content, 0.7×the CaO content, the $Li_2O$ content, the $TiO_2$ content, and the $ZrO_2$ content (MgO+0.7 CaO+$Li_2O+TiO_2+ZrO_2$) is preferably equal to or more than 16%, more preferably equal to or more than 18%, even more preferably equal to or more than 19%, further preferably equal to or more than 20%, and still more preferably equal to or more than 21%. Also, from the viewpoint of inhibiting a decrease in glass stability and inhibiting a decrease in a glass transition temperature, the above-described sum (MgO+0.7 CaO+$L_2O+TiO_2+ZrO_2$) is preferably equal to or less than 40%, more preferably equal to or less than 35%, even more preferably equal to or less than 30%, further preferably equal to or less than 28%, and still more preferably equal to or less than 25%.

From the viewpoint of improving chemical durability, a mole ratio of a total content of $SiO_2$ and $ZrO_2$ relative to the $Al_2O_3$ content (($SiO_2+ZrO_2$)/$Al_2O_3$) in Glass B is equal to or more than 2, preferably equal to or more than 3, more preferably equal to or more than 3.5, and even more preferably equal to or more than 4. Also, from the viewpoint of improving rigidity and raising a specific elastic modulus, the mole ratio (($SiO_2+ZrO_2$)/$Al_2O_3$) in Glass B is equal to or less than 13, preferably equal to or less than 10, more preferably equal to or less than 9, even more preferably equal to or less than 8, further preferably equal to or less than 7, and still more preferably equal to or less than 6. From the viewpoint of improving chemical durability, a mole ratio of the total content of $SiO_2$ and $ZrO_2$ relative to the $Al_2O_3$ content (($SiO_2+ZrO_2$)/$Al_2O_3$) in Glass A is preferably equal to or more than 2, and, from the viewpoint of improving rigidity and raising a specific elastic modulus, the mole ratio (($SiO_2+ZrO_2$)/$Al_2O_3$) is preferably equal to or less than 13. With respect to a more preferred range of the mole ratio of the total content of $SiO_2$ and $ZrO_2$ relative to the $Al_2O_3$ content (($SiO_2+ZrO_2$)/$Al_2O_3$) in Glass A, the above description regarding Glass B can be referred to.

ZnO serves to improve meltability and rigidity, but excessive introduction thereof raises the liquidus temperature of glass. From the above-described viewpoints, the content of ZnO in Glass A and Glass B ranges preferably from 0% to 5%, more preferably from 0% to 3%, even more preferably from 0% to 2%, further preferably from 0% to 1%, and still more preferably 0% to 0.5%. In an embodiment, the content of ZnO may be 0.00%.

$P_2O_5$ can be introduced into Glass A and Glass B, but excessive introduction thereof tends to lower chemical durability. Therefore, the content of $P_2O_5$ in Glass A and Glass B ranges preferably from 0% to 2%. The content of $P_2O_5$ ranges more preferably from 0% to 1%, and even more preferably from 0% to 0.5%. In an embodiment, the content of $P_2O_5$ may be 0.00%.

From the viewpoint of improving rigidity, the sum of the $SiO_2$ content, the $Al_2O_3$ content, the $B_2O_3$ content, the $P_2O_5$ content, 1.5×the $Na_2O$ content, 1.5×the $K_2O$ content, 2×the SrO content, 3×the BaO content, and the ZnO content ($SiO_2+Al_2O_3+B_2O_3+P_2O_5+1.5Na_2O+1.5K_2O+2SrO+3BaO+ZnO$) is preferably equal to or less than 86%, more preferably equal to or less than 84%, even more preferably equal to or less than 82%, further preferably equal to or less than 80%, still more preferably equal to or less than 78%, and yet more preferably equal to or less than 77%.

From the viewpoint of increasing a specific elastic modulus, the sum of the $SiO_2$ content, the $Al_2O_3$ content, the $B_2O_3$ content, the $P_2O_5$ content, the $Na_2O$ content, the $K_2O$ content, the CaO content, 2×the SrO content, and 3×the BaO content ($SiO_2+Al_2O_3+B_2O_3+P_2O_5+Na_2O+K_2O+CaO+2SrO+3BaO$) is preferably equal to or less than 92%, more preferably equal to or less than 90%, even more preferably equal to or less than 88%, further preferably equal to or less than 86%, and still more preferably equal to or less than 85%.

From the viewpoint of improving glass stability and rigidity, raising a specific elastic modulus, and improving chemical durability, a mole ratio of the $P_2O_5$ content relative to the total content of $B_2O_3$, $SiO_2$. $Al_2O_3$ and $P_2O_5$($P_2O_5$/($B_2O_3+SiO_2+Al_2O_3+P_2O_5$)) is preferably equal to or less than 0.005, more preferably equal to or less than 0.003, even more preferably equal to or less than 0.002, and further preferably equal to or less than 0.001. In an embodiment, the mole ratio ($P_2O_5/(B_2O_3+SiO_2+Al_2O_3+P_2O_5)$) may be 0.

From the viewpoint of obtaining a clarifying effect, Glass A and Glass B may contain at least one selected from the group consisting of $SnO_2$, $CeO_2$, and $Sb_2O_3$. In an embodiment, the total content of $SnO_2$ and $CeO_2$ may be 0%. In another aspect, Glass A and Glass B may contain $SnO_2$ and/or $CeO_2$, and the total content of $SnO_2$ and $CeO_2$ ($SnO_2+CeO_2$) ranges preferably from 0.05% to 2%. As a consequence of the fact that the total content of $SnO_2$ and $CeO_2$ is equal to or more than 0.05%, a sufficient clarifying effect can be obtained, and residual bubbles can be reduced or suppressed. Also, as a consequence of the fact that the total content ($SnO_2$ and $CeO_2$) is equal to or less than 2%, during melting of glass, lowering of productivity by the blow-up of molten glass can be prevented. The lower limit of the total content ($SnO_2+CeO_2$) is preferably equal to or more than 0.10%, more preferably equal to or more than 0.20%, even more preferably equal to or more than 0.25%, further preferably equal to or more than 0.30%, still more preferably equal to or more than 0.35%, and yet more preferably equal to or more than 0.40%. Also, the upper limit of the total content ($SnO_2+CeO_2$) is preferably equal to or less than 1.5%, more preferably equal to or less than 1.2%, even more preferably equal to or less than 1.0%, further preferably equal to or less than 0.70%, still more preferably equal to or less than 0.65%, yet more preferably equal to or less than 0.60%, further more preferably equal to or less than 0.55%, and still further preferably equal to or less than 0.50%.

$SnO_2$ serves to promote clarification in a state where the melting temperature of glass is comparatively high (a temperature range of approximately 1400° C. to 1600° C.). In a circumstance where use of a clarifying agent such as $Sb_2O_3$ and arsenious acid adversely affecting the environment is limited, in an embodiment, the introduction of $SnO_2$ into Glass A and Glass B is preferable for removing bubbles in glass having a high melting temperature. From the viewpoint of obtaining a clarifying effect, the content of $SnO_2$ is preferably equal to or more than 0.01%, more preferably equal to or more than 0.05%, even more preferably equal to or more than 0.10%, further preferably equal to or more than 0.15%, and still more preferably equal to or more than 0.20%. Also, the content of $SnO_2$ is preferably equal to or less than 2%, more preferably equal to or less than 1.5%, even more preferably equal to or less than 1.0%, further preferably equal to or less than 0.8%, and still more preferably equal to or less than 0.5%.

$CeO_2$ is a component that exhibits a glass clarification action as is the case for $SnO_2$. $CeO_2$ serves to take in oxygen and fix it as a glass component in a state where the melting temperature of glass is comparatively low (a temperature range approximately from 1200° C. to 1400° C.), and, in an embodiment, it is preferable to introduce $CeO_2$ into Glass A and Glass B as a clarifying agent. From the viewpoint of obtaining a clarifying effect, the content of $CeO_2$ is preferably equal to or more than 0.01%, more preferably equal to or more than 0.05%, even more preferably equal to or more than 0.08%, and further preferably equal to or more than 0.10%. Also, the content of $CeO_2$ is preferably equal to or less than 2%, more preferably equal to or less than 1.5%, even more preferably equal to or less than 1.0%, further preferably equal to or less than 0.8%, still more preferably equal to or less than 0.5%, and yet more preferably equal to or less than 0.3%. As a consequence of allowing $SnO_2$ and $CeO_2$ to coexist, a clarification action in a wide temperature range can be obtained, and thus, in an embodiment, Glass A and Glass B preferably contain both $SnO_2$ and $CeO_2$.

From the viewpoint of reducing environmental burdens, it is desirable to refrain from using $Sb_2O_3$. The content of $Sb_2O_3$ in Glass A and Glass B ranges preferably from 0% to 0.5%. The content of $Sb_2O_3$ is more preferably equal to or less than 0.3%, even more preferably equal to or less than 0.1%, further preferably equal to or less than 0.05%, and further preferably equal to or less than 0.02%, and particularly preferably $Sb_2O_3$ is not contained.

If $CeO_2$ is contained, the mole ratio of the $SnO_2$ content relative to the $CeO_2$ content ($SnO_2/CeO_2$) may be equal to or more than 0, preferably equal to or more than 0.1, more preferably equal to or more than 0.3, even more preferably equal to or more than 0.5, further preferably equal in or more than 0.7, still more preferably equal to or more than 0.9, yet more preferably equal to or more than 1.0, further more preferably equal to or more than 1.2, and still further preferably equal to or more than 1.4. Also, the mole ratio ($SnO_2/CeO_2$) is preferably equal to or less than 7, more preferably equal to or less than 6, even more preferably equal to or less than 5, further preferably equal to or less than 4, still more preferably equal to or less than 3.5, yet more preferably equal to or less than 3.0, further more preferably equal to or less than 2.5, still further preferably equal to or less than 2.3, and yet further preferably equal to or less than 2.1, 1.9, 1.8, or 1.7.

As will be described later with regard to a specific electrical resistance, glass with a low specific electrical resistance is preferable in an embodiment in which electric heating is performed at the time of melting glass. Glass with a low specific electrical resistance can be melted in a lower temperature in a furnace in electric heating. When the temperature in the furnace is lowered, it is preferable to increase a ratio of the $CeO_2$ content relative to the $SnO_2$ content with which a clarifying effect can be favorably exhibited at a lower temperature compared to $SnO_2$, that is, it is preferable to reduce the mole ratio ($SnO_2/CeO_2$).

Glass A and Glass B may contain Fe such that a glass composition based on oxides expressed on the basis of mass contains Fe, in terms of $Fe_2O_3$, in an amount of 1 mass % or less, 0.7 mass % or less, 0.5 mass % or less, 0.4 mass % or less, 0.3 mass % or less, 0.1 mass % or less, 0.07 mass % or less, 0.05 mass % or less, 0.04 mass % or less, or 0.03 mass % or less. In an embodiment, Glass A and Glass B may contain no Fe (the above-described content may be 0 mass %). Also, Glass A and Glass B may contain one or more selected from the group consisting of Cu, Co, Yb, Mn, Nd, Pr, Nb, V, Cr, Ni, Mo, Ho, and Er.

Pb, Cd, and As are substances that adversely affect the environment, and thus the introduction of these substances is preferably avoided.

Glass A and Glass B can be produced by weighing and blending raw glass materials such as oxides, carbonates, nitrates, sulfates, and hydroxides so as to give a predetermined glass composition, by sufficiently mixing these materials, heating and melting the mixture within a range of, for example, 1400° C. to 1600° C. in a melting vessel, and by molding homogenized molten glass that has been subjected to clarification and stirring to cause sufficient bubble separation. It is preferable to heat and melt raw glass materials in a melting tank at 1400° C. to 1550° C., to raise the temperature of the obtained molten glass in a clarification tank and keep the glass at 1450° C. to 1600° C., and after that to lower the temperature and cause glass to flow out at 1200° C. to 1400° C. to be molded, for example. Glass may be heated through electric heating, or using a heating method other than electric heating.

<Glass Properties>

As a consequence of performing the above-described composition adjustment, Glass A and Glass B can have various glass properties described below.

(Glass Transition Temperature)

As described above, usually, magnetic recording medium substrates are subjected to a high temperature treatment in a process for forming a magnetic recording layer on a substrate. In order to form a magnetic recording layer containing a magnetic material with high magnetic anisotropy energy, which has been developed recently for high-density recording with a magnetic recording medium, for example, usually, film formation is performed at high temperatures or heat treatment is performed at high temperatures after film formation. If a magnetic recording medium substrate does not have heat resistance capable of withstanding such a high temperature treatment, the flatness of the substrate exposed to high temperatures in a high temperature treatment is impaired. In contrast, Glass A and Glass B have a glass transition temperature (hereinafter, also referred to as "Tg"), which is an indicator related to heat resistance, of 650° C. or higher. A substrate comprised of a glass having high heat resistance such that the glass transition temperature is equal to or higher than 650° C. would be able to keep excellent flatness even after a high temperature treatment. However, Glass A and Glass B are not limited to a glass for a substrate of a magnetic recording medium having a magnetic recording layer containing a magnetic material that needs a high temperature treatment, and Glass A and Glass B can be used for producing magnetic recording media provided with various magnetic materials. A glass transition temperature is preferably equal to or higher than 660° C., more preferably equal to or higher than 670° C., even more preferably equal to or higher than 675° C., further preferably equal to or higher than 680° C., still more preferably equal to or higher than 685° C., and yet more preferably equal to or higher than 687° C. Also, the upper limit of a glass transition temperature is, for example, approximately 770° C. or 750° C. However, a higher glass transition temperature is more preferable from the viewpoint of heat resistance, and thus the upper limit is not particularly limited.

(Young's Modulus)

In order to handle the demands for rigidity improvement of a magnetic recording medium described above, it is desirable that a glass for a magnetic recording medium substrate has high rigidity. With respect to this point, Glass A and Glass B have a Young's modulus, which is an indicator for rigidity, of 90 GPa or more. According to a glass for a magnetic recording medium substrate having high rigidity represented by a Young's modulus of 90 GPa or more, it is possible to inhibit the deformation of a substrate while a spindle motor is rotating, and thus it is also possible to inhibit warpage and deflection of a magnetic recording medium, along with deformation of the substrate. The Young's moduli of Glass A and Glass B are preferably equal to or more than 91 GPa, more preferably equal to or more than 92 GPa, even more preferably equal to or more than 93 GPa, further preferably equal to or more than 94 GPa, and still more preferably equal to or more than 95 GPa. The upper limit of the Young's modulus is, for example, approximately 120 GPa. However, higher Young's modulus means higher rigidity, which is more preferable, and thus the upper limit is not particularly limited.

(Specific Gravity)

The specific gravity of Glass A is equal to or less than 2.75. Also, the specific gravity of Glass B is preferably equal to or less than 2.75. With regard to Glass A and Glass B, the specific gravity thereof is more preferably equal to or less than 2.73, even more preferably equal to or less than 2.70, further preferably equal to or less than 2.68, still more preferably equal to or less than 2.64, yet more preferably equal to or less than 2.62, and further more preferably equal to or less than 2.60. As a consequence of a reduction in the specific gravity of a glass for a magnetic recording medium substrate, the weight of a magnetic recording medium substrate and furthermore the weight of a magnetic recording medium can be reduced, and consequently suppression of power consumption of a magnetic recording and reproducing apparatus (usually, referred to as an "HDD") becomes possible. The lower limit of the specific gravity is, for example, approximately 2.40. However, a lower specific gravity is more preferable. Therefore, the lower limit is not particularly limited.

(Specific Elastic Modulus)

A specific elastic modulus is obtained by dividing the Young's modulus of glass by the density thereof. Here, density can be considered as a value obtained by giving a unit of $g/cm^3$ to the specific gravity of glass. From the viewpoint of providing a substrate that is less likely to be deformed, specific elastic moduli of Glass A and Glass B are preferably equal to or more than 30 MNm/kg, more preferably equal to or more than 32 MNm/kg, even more preferably equal to or more than 33 MNm/kg, further preferably equal to or more than 34 MNm/kg, and still more preferably equal to or more than 35 MNm/kg. The upper limit of a specific elastic modulus is, for example, approximately 40 MNm/kg. However, a higher specific elastic modulus is more preferable. Therefore, the upper limit is not particularly limited.

(Thermal Expansion Coefficient)

An HDD with a built-in magnetic recording medium has a structure in which the center portion is pressed down with a spindle of a spindle motor and a clamp and the magnetic recording medium itself is rotated. Thus, when there is a large difference between respective thermal expansion coefficients of a magnetic recording medium substrate and a spindle material constituting the spindle portion, deviation occurs during use between thermal expansion/thermal contraction of the spindle and thermal expansion/thermal contraction of the magnetic recording medium substrate relative to ambient temperature change. As a result, a phenomenon such as deformation of the magnetic recording medium occurs. When such a phenomenon occurs, a head cannot read written information to cause deterioration of reliability on recording/reproduction. Accordingly, a glass for a magnetic recording medium substrate is required to have a suitable thermal expansion coefficient at approximately the same level as that of a spindle material (e.g., stainless steel, for example). Generally, a spindle material for HDDs has an average linear expansion coefficient (thermal expansion coefficient) of $70 \times 10^{-7}/°$ C. or more within a temperature range of 100° C. to 300° C., and in a case where an average linear expansion coefficient of a glass for a magnetic recording medium substrate at 100° C. to 300° C. is equal to or more than $40 \times 10^{-7}/°$ C. the difference between a thermal expansion coefficient of the glass and that of a spindle material is small, and thus the glass for a magnetic recording medium substrate can contribute to improving the reliability of the magnetic recording medium. The average linear expansion coefficients (hereinafter, also referred to as "a") of Glass A and Glass B at 100° C. to 300° C. are preferably equal to or more than $40\times10^{-7}/°$ C., more preferably equal to or more than $41\times10^{-7}/°$ C., even more preferably equal to or more than $42\times10^{-7}/°$ C. further preferably equal to or more than $43\times10^{-7}/°$ C., still more preferably equal to or more than $44\times10^{-7}/°$ C., and yet more preferably equal to or more than $45\times10^{-7}/°$ C. Also, the average linear expansion coefficients (a) of Glass A and Glass B at 100° C. to 300° C. are preferably equal to or less than $70\times10^{-7}/°$ C., more preferably equal to or less than $68\times10^{-7}/°$ C., even more preferably equal to or less than $65\times10^{-7}/°$ C., further preferably equal to or less than $63\times10^{-7}/°$ C., still more preferably equal to or less than $60\times10^{-7}/°$ C. yet more preferably equal to or less than $57\times10^{-7}/°$ C., further more preferably equal to or less than $55\times10^{-7}/°$ C. still further preferably equal to or less than $53\times10^{-7}/°$ C. and yet further preferably equal to or less than $50\times10^{-7}/°$ C. In an embodiment, the average linear expansion coefficients (a) of Glass A and Glass B at 100° C. to 300° C. may be less than $48\times10^{-7}/°$ C., and may also be equal to or less than $47\times10^{-7}/°$ C.

(Glass Stability)

Glass A and Glass B can exhibit high glass stability. Methods for evaluating glass stability can include a 1300° C. and 16 hour holding test as well as a 1250° C. and 16 hour holding test, which will be described later in detail. Preferably, evaluation result A is given in a 1300° C. and 16 hour holding test, more preferably evaluation result A is given in a 1300° C. and 16 hour holding test as well as evaluation result A or B is given in a 1250° C. and 16 hour holding test, and even more preferably evaluation result A is given in both of the holding tests.

(Bubble Density)

In Glass A and Glass B, a reduction in bubbles is also possible by aforementioned composition adjustment. It is desirable to reduce bubbles in glass for a magnetic recording medium substrate. This is because of the following reasons. With the progress of high-density recording being made in recent years, there is now demand for a reduction in the distance between the head (magnetic head) for writing or reading data and a surface of the magnetic recording medium (referred to as a "flying height"). However, when irregularity due to a bubble is present on the surface of a glass substrate for a magnetic recording medium, the irregularity is reflected on the surface of the magnetic recording medium to thereby lower the surface smoothness of the magnetic recording medium. When a magnetic head is moved closer to a magnetic recording medium surface having inferior surface smoothness, the magnetic head may come into contact with the magnetic recording medium surface to damage the magnetic head. Therefore, it is inevitable to secure some degree of flying height in order to prevent the contact. From the above viewpoint, in order to narrow the flying height, it is desirable to reduce bubbles in glass for a magnetic recording medium substrate to produce a magnetic recording medium having high surface smoothness. With respect to bubbles in glass, in terms of density of bubbles each having a diameter exceeding 0.03 mm when observation is performed with an optical microscope (magnifications from 40 to 100), bubble density per unit mass is preferably less than 50/kg, more preferably less than 20/kg, even more preferably less than 10/kg, further preferably equal to or less than 2/kg, and most preferably 0/kg.

(Specific Electrical Resistance)

It is also possible to reduce the specific electrical resistance of Glass A and Glass B through aforementioned composition adjustment. Glass with a low specific electrical resistance is preferable in light of the fact that such glass is unlikely to erode or is less likely to erode a melting furnace (e.g., made of brick) in an embodiment in which electric heating is performed at the time of melting glass. Although a melting furnace is eroded if electric current flows to the melting furnace in electric heating, if glass in the melting furnace has a high specific electrical resistance, electric current is likely to flow to the melting furnace. If the melting furnace is eroded, glass may leak from the melting furnace, or components generated as a result of the melting furnace being eroded may be mixed into glass, for example. Thus, it is preferable that the erosion of a melting furnace can be inhibited. It is possible to adopt the natural logarithm $\ln\rho$ of a specific electrical resistance p as an indicator for a low specific electrical resistance. In an embodiment, with regard to Glass A and Glass B, the natural logarithm $\ln\rho$ (no unit) of the specific electrical resistance $\rho$ (the unit is $\Omega\cdot$cm) at 1450° C. is preferably equal to or less than 3.20, more preferably equal to or less than 3.00, even more preferably equal to or less than 2.90, further preferably equal to or less than 2.80, still more preferably equal to or less than 2.70, yet more preferably equal to or less than 2.68, and further more preferably equal to or less than 2.65. Also, the natural logarithm $\ln\rho$ of the specific electrical resistance $\rho$ at 1450° C. may be equal to or more than 1, for example.

[Magnetic Recording Medium Substrate]

A magnetic recording medium substrate according to an aspect of the present invention is comprised of Glass A or Glass B.

Magnetic recording medium substrates can be manufactured through processes for heating raw glass materials to thereby prepare molten glass, for molding the molten glass into a plate shape by any one of a press molding method, a down-draw method, and a float method, and for processing the obtained plate-shaped glass. In a press molding method, molten glass flowing out from a glass outflow pipe is cut to a predetermined volume to give an intended molten glass lump, which is press-molded with a press molding die to thereby produce a thin-walled disk-shaped substrate blank, for example. Subsequently, the obtained substrate blank is given a center hole, and subjected to outer/inner circumference processing, lapping, and polishing for both main surfaces. Subsequently, a disk-shaped substrate can be obtained through cleaning processes including acid cleaning and alkali cleaning.

In the above magnetic recording medium substrate, in an embodiment, the surface composition and internal composition thereof are homogeneous. Here, "the surface composition and internal composition thereof are homogeneous" means that no ion exchange has been performed (that is, an ion-exchange layer is not contained). In a case where an HDD (hard disk drive) with a built-in magnetic recording medium is used under circumstances that hardly receive impact from the outside, and the like, for example, a magnetic recording medium substrate having no ion-exchange layer can be used. Note that a magnetic recording medium substrate having no ion-exchange layer has not been subjected to an ion exchange treatment, and thus manufacturing costs can be drastically reduced.

Also, in an embodiment, the above-described magnetic recording medium substrate has an ion-exchange layer on a part of or on the entirety of the surface. An ion-exchange layer exhibits compression stress, and thus the presence or absence of an ion-exchange layer can be confirmed by fracturing the substrate perpendicularly to a main surface and obtaining a stress profile by the Babinet method in the fracture surface. A "main surface" is a surface of a substrate on which a magnetic recording layer is to be provided or has been provided. This surface is a surface having the largest area among surfaces of a magnetic recording medium substrate, and thus is referred to as a main surface. In a case of a disk-shaped magnetic recording medium, the main surface corresponds to a circular surface (if there is a center hole, the center hole is excluded) of the disk. The presence or absence of an ion-exchange layer can be confirmed also by a method or the like for measuring concentration distribution of alkali metal ions in the depth direction from the substrate surface.

An ion-exchange layer can be formed by bring an alkali salt into contact with a substrate surface under high temperatures and exchanging an alkali metal ion in the alkali salt for an alkali metal ion in the substrate. Known techniques can be applied to ion exchange (also referred to as a "strengthening treatment" or "chemical strengthening"), and as an example, paragraphs 0068 to 0069 in WO 2011/019010A1 can be referred to.

A thickness of the above-described magnetic recording medium substrate is equal to or less than 1.5 mm, preferably equal to or less than 1.2 mm, and more preferably equal to or less than 1 mm, for example. The lower limit of the thickness is preferably 0.3 mm. Furthermore, the above-described magnetic recording medium substrate preferably has a disk shape having a center hole.

The above-described magnetic recording medium substrate is comprised of an amorphous glass. Amorphous glass can realize good surface smoothness when it is processed into a substrate, as compared with crystallized glass.

[Magnetic Recording Medium]

An aspect of the present invention relates to a magnetic recording medium having a magnetic recording layer on the above-described magnetic recording medium substrate.

A magnetic recording medium is referred to as a magnetic disk, hard disk, or the like, and is suitable for various magnetic recording and reproducing apparatuses, such as: internal memories (such as fixed disk) for desktop personal computers, computers for servers, notebook computers, and mobile personal computers; internal memories for portable recording and reproducing apparatuses for recording and reproducing images and/or voices; and recording and reproducing devices for in-vehicle audio devices. In the present invention and this specification, a "magnetic recording and reproducing apparatus" means an apparatus capable of performing one of or both of magnetic recording of information and magnetic reproduction of information.

A magnetic recording medium has a configuration in which, for example, at least an adhesive layer, an undercoat layer, a magnetic layer (magnetic recording layer), a protecting layer, and a lubricating layer are stacked, in that order from a main surface, on the main surface of a magnetic recording medium substrate.

A magnetic recording medium substrate is introduced into an evacuated film formation apparatus, and sequential film formation from the adhesive layer to the magnetic layer is performed over the main surface of a magnetic recording medium substrate by a DC (Direct Current) magnetron sputtering process in an Ar atmosphere, for example. CrTi can be used for the adhesive layer, for example, and a material containing Ru or MgO can be used for the undercoat layer, for example. Note that a soft magnetic layer or a heat sink layer may also be added as appropriate. After the above-described film formation, for example, by a CVD (Chemical Vapor Deposition) process, the protecting layer is formed using $C_2H_4$, which is subjected to a nitriding treatment of introducing nitrogen to the surface in the same chamber to thereby be able to form a magnetic recording medium. Thereafter, for example, applying PFPE (polyfluoropolyether) onto the protecting layer by a dip coat method makes it possible to form the lubricating layer.

In order to achieve further higher density recording with a magnetic recording medium, a magnetic recording layer preferably contains a magnetic material with high magnetic anisotropy energy. Magnetic materials preferable from this viewpoint can include Fe—Pt-based magnetic materials and Co—Pt-based magnetic materials. Note that, here, "-based" means inclusion. Namely, the above-described magnetic recording medium preferably has a magnetic recording layer containing Fe and Pt, or Co and Pt, as the magnetic recording layer. With respect to a magnetic recording layer containing these magnetic materials and to a film formation method thereof, descriptions in paragraph 0074 in WO 2011/019010A1, and Examples in this publication can be referred to. Furthermore, a magnetic recording medium having such a magnetic recording layer is preferably applied to a magnetic recording apparatus by a recording system referred to as an energy-assisted recording system. Among energy-assisted recording systems, a recording system in which magnetization reversal is assisted by irradiation with near-field light or the like is referred to as a heat-assisted recording system, and a recording system in which magnetization reversal is assisted by microwaves is referred to as a microwave-assisted recording system. With respect to details of these, paragraph 0075 in WO 2011/019010A1 can be referred to. Note that a conventional CoPtCr-based material may be used as a magnetic material for forming a magnetic recording layer.

Incidentally, in recent years, a significant reduction in a gap between a recording and reproducing element portion of a magnetic head and a surface of a magnetic recording medium (low floating amount) is achieved by mounting a DFH (Dynamic Flying Height) mechanism on a magnetic head, and thereby the achievement of further higher recording density is realized. The DFH mechanism is a function that causes only the vicinity of a recording and reproducing element portion to project in the medium surface direction, by providing a heating portion such as a micro heater near the element portion of a magnetic head. Consequently, the distance (flying height) between the magnetic head and the magnetic recording layer of a medium becomes smaller, and thus it becomes possible to pick out signals from smaller magnetic particles and to achieve further higher recording density. On the other hand, however, the gap (flying height) between the element portion of a magnetic head and the medium surface becomes extremely small. When irregularity due to a bubble is present on the surface of a magnetic recording medium substrate, the irregularity is reflected on the surface of the magnetic recording medium to thereby lower the surface smoothness of the magnetic recording medium. As described above, when a magnetic head is moved closer to a magnetic recording medium surface having inferior surface smoothness, the magnetic head may come into contact with the magnetic recording medium surface to damage the magnetic head. Therefore, it is inevitable to secure some degree of flying height in order to prevent the contact. From the above viewpoint, in magnetic recording medium substrates, it is desirable to reduce bubbles on substrates in order to produce a magnetic recording medium having high surface smoothness. The reduction in bubbles on a substrate makes it possible to narrow flying height. In the above-described magnetic recording medium substrate, preferably bubbles have been reduced, and thus the above-described magnetic recording medium provided with the substrate like this is also suitable for magnetic recording apparatuses on which a DFH mechanism with extremely narrowed flying height is mounted.

There are no particular limitation on dimensions of both of the above-described magnetic recording medium substrate (for example, magnetic disk substrate) and magnetic recording medium (for example, magnetic disk), and for example, the medium and substrate can also be downsized because higher recording density is possible. They can have a dimension of a nominal diameter of, needless to say, 2.5 inches, a smaller diameter (for example, 1 inch, 1.8 inches), 3 inches, 3.5 inches or the like. Although the thickness may be 0.3 to 2 mm, for example, Glass A and Glass B are suitable for reducing the thickness thereof because Glass A and Glass B have high heat resistance and rigidity. Reducing the thickness thereof makes it possible to increase the number of magnetic recording media mounted on an HDD, and accordingly to increase the storage capacity of the HDD. From this viewpoint, the thickness is preferably equal to or less than 0.635 mm, more preferably equal to or less than 0.550 mm, even more preferably equal to or less than 0.500 mm, and further preferably equal to or less than 0.400 mm in terms of a nominal value.

[Glass Spacer for Magnetic Recording and Reproducing Apparatus]

An aspect of the present invention relates to a glass spacer for a magnetic recording and reproducing apparatus, the glass spacer comprising an amorphous oxide glass, wherein,
an $SiO_2$ content ranges from 56 mol % to 80 mol %;
an $Li_2O$ content ranges from 1 mol % to 10 mol %;
a $B_2O_3$ content ranges from 0 mol % to 4 mol %;
a total content of MgO and CaO (MgO+CaO) ranges from 9 mol % to 40 mol %; and
the oxide glass has a specific gravity of 2.75 g/cm$^3$ or less, a glass transition temperature of 650° C. or higher, and a Young's modulus of 90 GPa or more.

Also, an aspect of the present invention relates to a glass spacer for a magnetic recording and reproducing apparatus, the glass spacer comprising an amorphous oxide glass, wherein,
an $SiO_2$ content ranges from 56 mol % to 80 mol %;
an $Li_2O$ content ranges from 1 mol % to 10 mol %;
a $B_2O_3$ content ranges from 0 mol % to 4 mol %;
a total content of MgO and CaO (MgO+CaO) ranges from 9 mol % to 40 mol %;
a mole ratio of a total content of $SiO_2$ and $ZrO_2$ relative to an $Al_2O_3$ content (($SiO_2$+$ZrO_2$)/$Al_2O_3$) ranges from 2 to 13; and
the oxide glass has a glass transition temperature of 650° C. or higher, and a Young's modulus of 90 GPa or more.

A magnetic recording medium can be used for magnetically recording and/or reproducing information in a magnetic recording and reproducing apparatus. A magnetic recording and reproducing apparatus is usually provided with a spacer for fixing a magnetic recording medium to a spindle of a spindle motor and/or for keeping a distance between a plurality of magnetic recording media. In recent years, the use of a glass spacer as the spacer like this is proposed. For a reason similar to the reason described in detail regarding a glass for a magnetic recording medium substrate, it is also desirable that this spacer has high heat resistance and rigidity. To address this, the above-described glass is suitable as a glass spacer for a magnetic recording and reproducing apparatus since the above-described glass can have high heat resistance and rigidity, as described above about Glass A and Glass B.

A spacer for a magnetic recording and reproducing apparatus is a ring-shaped member, and details of a configuration of the glass spacer, a method for manufacturing the glass spacer, and the like are known. Furthermore, with respect to a method for manufacturing a glass spacer, the above description about a method for manufacturing a glass for a magnetic recording medium substrate and a method for manufacturing a magnetic recording medium substrate can also be referred to. Also, with respect to other details of a glass composition, glass properties and the like of the glass spacer for a magnetic recording and reproducing apparatus according to an aspect of the present invention, the above description about the glass for a magnetic recording medium substrate, magnetic recording medium substrate and magnetic recording medium according to respective aspects of the present invention can be referred to.

Note that the glass spacer for a magnetic recording and reproducing apparatus can be comprised of the above-described glass, or may have a configuration in which one or more films such as conductive films are formed on a surface of the above-described glass. In order to eliminate static electricity generated while a magnetic recording medium is rotating, a conductive film such as an NiP alloy film can also be formed on the surface of a glass spacer through plating, or using an immersion method, a vapor deposition method, a sputtering method, or the like. Also, the surface smoothness of a glass spacer can be enhanced through polishing processing (for example, average surface roughness is equal to or less than 1 µm), which can increase an adhesion between a magnetic recording medium and a spacer to thereby inhibit the occurrence of positional displacement.

[Magnetic Recording and Reproducing Apparatus]

An aspect of the present invention relates to a magnetic recording and reproducing apparatus, which includes at least one of:
the magnetic recording medium according to an aspect of the present invention; and
the glass spacer according to an aspect of the present invention.

A magnetic recording and reproducing apparatus includes at least one magnetic recording medium and at least one spacer, and further includes usually a spindle motor for rotationally driving the magnetic recording medium, and at least one magnetic head for performing recording and/or reproduction of information to the magnetic recording medium.

The above-described magnetic recording and reproducing apparatus according to an aspect of the present invention can include, as at least one magnetic recording medium, the magnetic recording medium according to an aspect of the present invention, and also can include a plurality of the magnetic recording media according to an aspect of the present invention. The above-described magnetic recording and reproducing apparatus according to an aspect of the present invention can include, as at least one spacer, the glass spacer according to an aspect of the present invention, and also can include a plurality of the glass spacers according to an aspect of the present invention. A small difference between a thermal expansion coefficient of a magnetic recording medium and a thermal expansion coefficient of a spacer is preferable from the viewpoint of inhibiting the occurrence of phenomena that may arise due to the difference between thermal expansion coefficients of the two, for example, strain of a magnetic recording medium and lowering of stability during the rotation due to positional displacement of a magnetic recording medium. From this viewpoint, it is preferable that the magnetic recording and reproducing apparatus according to an aspect of the present invention includes: the magnetic recording medium according to an aspect of the present invention, as at least one magnetic recording medium, and as more magnetic recording media in a case where a plurality of magnetic recording media are to be included; and includes: the glass spacer according to an aspect of the present invention, as at least one spacer, and as more spacers in a case where a plurality of spacers are to be included. Furthermore, for example, the magnetic recording and reproducing apparatus according to an aspect of the present invention can be one in which the glass constituting the magnetic recording medium substrate contained in the magnetic recording medium and the glass constituting the glass spacer have the same glass composition.

The magnetic recording and reproducing apparatus according to an aspect of the present invention may be one that contains at least one of the magnetic recording medium according to an aspect of the present invention and the glass spacer according to an aspect of the present invention. Known techniques related to magnetic recording and reproducing apparatuses can be applied to other points. In an embodiment, it is possible to use an energy-assisted magnetic recording head having: an energy source (for example, heat source such as a laser light source, microwaves, and the like) for assisting magnetization reversal (assisting writing of magnetic signals); a recording element portion; and a reproducing element portion. The magnetic recording and reproducing apparatus, as described above, using an energy-assisted recording system that includes the energy-assisted magnetic recording head is useful as a magnetic recording and reproducing apparatus having high recording density and high reliability. Furthermore, when manufacturing a magnetic recording medium used for a magnetic recording and reproducing apparatus of an energy-assisted recording system such as a heat-assisted recording system provided with a heat-assisted magnetic recording head having a laser light source or the like, sometimes a magnetic recording layer containing a magnetic material with high magnetic anisotropy energy is formed on a magnetic recording medium substrate. In order to form such a magnetic recording layer, film formation is usually performed at high temperatures or heat treatment is performed at high temperatures after film formation. The magnetic recording medium substrate according to an aspect of the present invention is preferable as a magnetic recording medium substrate that may have high heat resistance capable of withstanding such treatment at high temperatures. However, the magnetic recording and reproducing apparatus according to an aspect of the present invention is not limited to an energy-assisted magnetic recording and reproducing apparatus.

EXAMPLES

Hereinafter, the present invention will be described in more detail with reference to Examples. However, the present invention is not limited to embodiments represented in Examples.

Examples No. 1 to No. 76

Raw materials such as oxides, carbonates, nitrates, and hydroxides were weighed so as to give glasses with respective compositions as shown in the following tables, and these materials were then mixed to give respective blended raw materials. Each molten glass obtained by introducing the blended raw material into a melting tank and by heating and melting the same in a range of 1400° C. to 1600° C., was held at 1400° C. to 1550° C. for 6 hours in a clarification tank. Then, the temperature was lowered (temperature decrease) and each molten glass was held in a range of 1200° C. to 1400° C. for 1 hour and was then molded to give each glass (amorphous oxide glass) for evaluation described below. The above-described heating can be performed using various heating methods such as electric heating.

[Evaluation Method]

(1) Glass Transition Temperature (Tg), Average Linear Expansion Coefficient ($\alpha$)

Glass transition temperature Tg, and average linear expansion coefficient $\alpha$ at 100° C. to 300° C. of each glass were measured using a thermomechanical analysis (TMA) apparatus.

(2) Young's Modulus

The Young's modulus of each glass was measured using an ultrasonic method.

(3) Specific Gravity

The specific gravity of each glass was measured using the Archimedes method.

(4) Specific Elastic Modulus

A specific elastic modulus was calculated from the Young's modulus obtained in (2) and the specific gravity obtained in (3).

(5) Glass Stability 100 g of each glass was placed in a platinum crucible, and the crucible was introduced into a heating furnace whose in-furnace temperature was set to 1250° C. or 1300° C., and was then left for 16 hours while the in-furnace temperature was maintained (holding test). After a lapse of 16 hours, the crucible was taken out from the heating furnace, each glass in the crucible was moved onto a refractory and was cooled to room temperature, the presence or absence of crystals of the glass was observed with an optical microscope, and evaluation was performed according to the criteria below.

A: No crystals are confirmed through magnification observation (magnifying power of 40 to 100) with an optical microscope.

B: Crystals are confirmed through magnification observation (magnifying power of 40 to 100) with an optical microscope, but no crystals are confirmed through visual observation.

C: Crystals are observed through visual observation.

(6) Evaluation of Bubble Density Rank

From the molten glass obtained in the above method, a glass plate (substrate blank) having a thickness of about 1.2 mm was produced. The surface of this glass plate was polished so as to be flat and to be smooth. From the polished surface, the inside of the glass was subjected to magnification observation (magnifying power of 40 to 100) with an optical microscope, and the number of bubbles each having a diameter exceeding 0.03 mm (hereinafter, simply referred to as "bubble") was counted. The number of counted bubbles was divided by a mass of glass corresponding to the region subjected to the magnification observation and the division result was defined as a density of bubbles.

Bubble density ranks were evaluated on the basis of S-rank to F-rank in accordance with the bubble density obtained by the above-described method. Specifically, ranks were defined as follows. S-rank: bubble density is 0/kg, A-rank: bubbles are present and bubble density is equal to or less than 2/kg, B-rank: bubble density exceeds 2/kg and is less than 10/kg, C-rank: bubble density is equal to or more than 10/kg and is less than 20/kg, D-rank: bubble density is equal to or more than 20/kg and is less than 50/kg, E-rank:

bubble density is equal to or more than 50/kg and is less than 80, and F-rank: bubble density is equal to or more than 80/kg.

(7) Natural Logarithm $\ln\rho$ of Specific Electrical Resistance $\rho$ (1450° C.)

A glass to be subjected to specific electrical resistance measurement was melted to prepare a molten glass having a temperature of t° C., and an electrical conductivity σ (the unit is S/cm) of the molten glass was measured using annular electrodes (the distance between the electrodes was 15 mm) made of Pt—Rh, under the conditions at a voltage of 50 mV and a frequency of 20 kHz. A cell constant was determined using a KCl solution (having a temperature of 25° C.) having a concentration of 1 mol/dm³ as a reference solution. An electrical conductivity σ was obtained for each temperature t at a temperature interval of about 25° C. to 45° C. in a temperature range of about 1200° C. to about 1600° C., and σ at 1450° C. was obtained from a straight line obtained by an Arrhenius plot of the obtained σ. A specific electrical resistance σ at 1450° C. was obtained using an equation of specific electrical resistance $\rho=1/\sigma$ from σ at 1450° C. obtained in this manner, and a natural logarithm $\ln\rho$ of the obtained $\rho$ was calculated.

The above results are shown in the tables below.

TABLE 1

| No. | 1 | 2 | 3 | 4 | 5 | 6 | 7 |
|---|---|---|---|---|---|---|---|
| $SiO_2$ | 56.50 | 56.55 | 56.50 | 56.50 | 56.50 | 56.50 | 56.50 |
| $Al_2O_3$ | 10.00 | 10.00 | 13.50 | 14.50 | 14.50 | 15.00 | 16.00 |
| $B_2O_3$ | 0.00 | 0.00 | 0.00 | 0.00 | 0.00 | 0.00 | 0.00 |
| MgO | 25.80 | 17.40 | 11.00 | 13.00 | 12.00 | 11.00 | 10.00 |
| CaO | 3.00 | 5.00 | 8.00 | 3.00 | 4.00 | 9.70 | 9.80 |
| SrO | 0.00 | 0.00 | 0.00 | 0.00 | 0.00 | 0.00 | 0.00 |
| BaO | 0.00 | 0.00 | 0.00 | 0.00 | 0.00 | 1.00 | 0.00 |
| ZnO | 0.00 | 0.00 | 0.00 | 0.00 | 0.00 | 0.00 | 0.00 |
| $ZrO_2$ | 0.00 | 0.00 | 1.00 | 0.00 | 0.00 | 0.00 | 0.00 |
| $Li_2O$ | 3.00 | 1.50 | 2.00 | 3.00 | 2.00 | 1.50 | 1.50 |
| $Na_2O$ | 0.00 | 5.50 | 5.00 | 6.00 | 5.00 | 3.50 | 5.50 |
| $K_2O$ | 0.00 | 0.00 | 0.00 | 0.00 | 0.00 | 1.50 | 0.40 |
| $TiO_2$ | 1.50 | 3.90 | 2.60 | 3.70 | 5.80 | 0.00 | 0.00 |
| $Y_2O_3$ | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 |
| $SnO_2$ | 0.10 | 0.05 | 0.20 | 0.20 | 0.10 | 0.10 | 0.10 |
| $CeO_2$ | 0.10 | 0.10 | 0.20 | 0.10 | 0.10 | 0.20 | 0.10 |
| $Sb_2O_3$ | 0.00 | 0.00 | 0.00 | 0.00 | 0.00 | 0.00 | 0.10 |
| Total | 100.00 | 100.00 | 100.00 | 100.00 | 100.00 | 100.00 | 100.00 |

| No. | 8 | 9 | 10 | 11 | 12 | 13 | 14 | 15 |
|---|---|---|---|---|---|---|---|---|
| $SiO_2$ | 56.50 | 56.50 | 58.00 | 57.00 | 57.00 | 57.00 | 58.00 | 58.00 |
| $Al_2O_3$ | 16.50 | 17.00 | 12.50 | 17.00 | 17.80 | 18.00 | 11.00 | 15.00 |
| $B_2O_3$ | 0.00 | 0.00 | 2.90 | 0.00 | 0.00 | 0.00 | 2.00 | 0.00 |
| MgO | 10.00 | 10.00 | 12.00 | 10.00 | 10.00 | 10.00 | 11.00 | 10.00 |
| CaO | 9.70 | 7.70 | 9.80 | 9.70 | 3.00 | 7.60 | 10.70 | 9.80 |
| SrO | 0.00 | 2.00 | 0.00 | 0.00 | 0.00 | 0.00 | 1.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $ZrO_2$ | 0.00 | 0.00 | 0.00 | 0.00 | 0.00 | 0.00 | 2.00 | 0.00 |
| $Li_2O$ | 1.00 | 2.00 | 2.00 | 2.00 | 4.00 | 4.00 | 1.50 | 2.00 |
| $Na_2O$ | 5.00 | 3.50 | 2.50 | 4.00 | 4.00 | 1.00 | 2.50 | 4.90 |
| $K_2O$ | 1.00 | 1.00 | 0.00 | 0.00 | 0.00 | 0.00 | 0.00 | 0.00 |
| $TiO_2$ | 0.00 | 0.00 | 0.00 | 0.00 | 4.00 | 2.00 | 0.00 | 0.00 |
| $Y_2O_3$ | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 |
| $SnO_2$ | 0.20 | 0.10 | 0.10 | 0.10 | 0.10 | 0.30 | 0.20 | 0.20 |
| $CeO_2$ | 0.10 | 0.20 | 0.10 | 0.20 | 0.10 | 0.10 | 0.10 | 0.10 |
| $Sb_2O_3$ | 0.00 | 0.00 | 0.10 | 0.00 | 0.00 | 0.00 | 0.00 | 0.00 |
| Total | 100.00 | 100.00 | 100.00 | 100.00 | 100.00 | 100.00 | 100.00 | 100.00 |

TABLE 2

| No. | 1 | 2 | 3 | 4 | 5 | 6 | 7 | 8 |
|---|---|---|---|---|---|---|---|---|
| $SiO_2 + Al_2O_3$ | 66.50 | 66.55 | 70.00 | 71.00 | 71.00 | 71.50 | 72.50 | 73.00 |
| MgO + CaO | 28.80 | 22.40 | 19.00 | 16.00 | 16.00 | 20.70 | 19.80 | 19.70 |
| MgO + CaO + SrO + BaO | 28.80 | 22.40 | 19.00 | 16.00 | 16.00 | 21.70 | 19.80 | 19.70 |
| CaO/MgO | 0.116 | 0.287 | 0.727 | 0.231 | 0.333 | 0.882 | 0.980 | 0.970 |
| $Li_2O + Na_2O + K_2O$ | 3.00 | 7.00 | 7.00 | 9.00 | 7.00 | 6.50 | 7.40 | 7.00 |
| $Na_2O/Li_2O$ | 0.00 | 3.67 | 2.50 | 2.00 | 2.50 | 2.33 | 3.67 | 5.00 |
| $(CaO + Na_2O)/(MgO + Li_2O)$ | 0.10 | 0.56 | 1.00 | 0.56 | 0.64 | 1.06 | 1.33 | 1.34 |
| $Li_2O/(MgO + CaO)$ | 0.10 | 0.07 | 0.11 | 0.19 | 0.13 | 0.07 | 0.08 | 0.05 |
| $4Li_2O + 2Na_2O + K_2O$ | 12.00 | 17.00 | 18.00 | 24.00 | 18.00 | 14.50 | 17.40 | 15.00 |
| $SiO_2/(Li_2O + Na_2O + K_2O)$ | 18.83 | 8.08 | 8.07 | 6.28 | 8.07 | 8.69 | 7.64 | 8.07 |
| $(SiO_2 + ZrO_2)/Al_2O_3$ | 5.65 | 5.66 | 4.26 | 3.90 | 3.90 | 3.77 | 3.53 | 3.42 |
| $Li_2O/(Li_2O + Na_2O + K_2O)$ | 1.00 | 0.21 | 0.29 | 0.33 | 0.29 | 0.23 | 0.20 | 0.14 |

TABLE 2-continued

|  | | | | | | | |
|---|---|---|---|---|---|---|---|
| $Na_2O/(Li_2O + Na_2O + K_2O)$ | 0.00 | 0.79 | 0.71 | 0.67 | 0.71 | 0.54 | 0.74 | 0.71 |
| $SnO_2 + CeO_2$ | 0.20 | 0.15 | 0.40 | 0.30 | 0.20 | 0.30 | 0.20 | 0.30 |
| $SnO_2/CeO_2$ | 1.00 | 0.50 | 1.00 | 2.00 | 1.00 | 0.50 | 1.00 | 2.00 |
| $(TiO_2 + Al_2O_3)/(MgO + CaO)$ | 0.399 | 0.621 | 0.847 | 1.138 | 1.269 | 0.725 | 0.808 | 0.838 |
| $(MgO + CaO)/(MgO + CaO + SrO + BaO)$ | 1.000 | 1.000 | 1.000 | 1.000 | 1.000 | 0.954 | 1.000 | 1.000 |
| $MgO/(MgO + CaO + SrO + BaO)$ | 0.90 | 0.78 | 0.58 | 0.81 | 0.75 | 0.51 | 0.51 | 0.51 |
| $BaO/(MgO + CaO + SrO + BaO)$ | 0.00 | 0.00 | 0.00 | 0.00 | 0.00 | 0.05 | 0.00 | 0.00 |
| $MgO + 0.7CaO + Li_2O + TiO_2 + ZrO_2$ | 32.40 | 26.30 | 22.20 | 21.80 | 22.60 | 19.29 | 18.36 | 17.79 |
| $P_2O_5/(B_2O_3 + SiO_2 + Al_2O_3 + P_2O_5)$ | 0.000 | 0.000 | 0.000 | 0.000 | 0.000 | 0.000 | 0.000 | 0.000 |
| $5Li_2O + 3Na_2O + 3K_2O + 2B_2O_3 + MgO + 2CaO + 3SrO + BaO$ | 46.80 | 51.40 | 52.00 | 52.00 | 45.00 | 53.90 | 54.80 | 52.40 |
| $SiO_2 + Al_2O_3 + B_2O_3 + P_2O_5 + 1.5Na_2O + 1.5K_2O + 2SrO + 3BaO + ZnO$ | 66.50 | 74.80 | 77.50 | 80.00 | 78.50 | 82.00 | 81.35 | 82.00 |
| $SiO_2 + Al_2O_3 + B_2O_3 + P_2O_5 + Na_2O + K_2O + CaO + 2SrO + 3BaO$ | 69.50 | 77.05 | 83.00 | 80.00 | 80.00 | 89.20 | 88.20 | 88.70 |
| Tg(° C.) | 700 | 675 | 681 | 675 | 695 | 682 | 682 | 696 |
| $\alpha(*10^{-7}/°$ C.) | 53.0 | 65.5 | 66.1 | 61.5 | 65.2 | 65.2 | 68.7 | 58.8 |
| Specific gravity | 2.65 | 2.59 | 2.65 | 2.57 | 2.61 | 2.65 | 2.61 | 2.61 |
| Young's modulus (GPa) | 99.1 | 92.8 | 91 | 90.3 | 91.3 | 91.8 | 90.9 | 92.4 |
| Specific elastic modulus (MNm/kg) | 37.4 | 35.8 | 34.3 | 35.2 | 35.0 | 34.6 | 34.9 | 35.4 |
| 1300° C. and 16 hour holding test | A | A | A |  |  | A | A | A |
| 1250° C. and 16 hour holding test |  | A | A | C | C | A | A | A |
| Bubble density rank | B | A | S | S | A | B | A | S |
| Natural log lnp of specific electrical resistance ρ (1450° C.) | | | | | | | | |

| No. | 9 | 10 | 11 | 12 | 13 | 14 | 15 |
|---|---|---|---|---|---|---|---|
| $SiO_2 + Al_2O_3$ | 73.50 | 70.50 | 74.00 | 74.80 | 75.00 | 69.00 | 73.00 |
| $MgO + CaO$ | 17.70 | 21.80 | 19.70 | 13.00 | 17.60 | 21.70 | 19.80 |
| $MgO + CaO + SrO + BaO$ | 19.70 | 21.80 | 19.70 | 13.00 | 17.60 | 22.70 | 19.80 |
| CaO/MgO | 0.770 | 0.817 | 0.970 | 0.300 | 0.760 | 0.973 | 0.980 |
| $Li_2O + Na_2O + K_2O$ | 6.50 | 4.50 | 6.00 | 8.00 | 5.00 | 4.00 | 6.90 |
| $Na_2O/Li_2O$ | 1.75 | 1.25 | 2.00 | 1.00 | 0.25 | 1.67 | 2.45 |
| $(CaO + Na_2O)/(MgO + Li_2O)$ | 0.93 | 0.88 | 1.14 | 0.50 | 0.61 | 1.06 | 1.23 |
| $Li_2O/(MgO + CaO)$ | 0.11 | 0.09 | 0.10 | 0.31 | 0.23 | 0.07 | 0.10 |
| $4Li_2O + 2Na_2O + K_2O$ | 16.00 | 13.00 | 16.00 | 24.00 | 18 00 | 11.00 | 17.80 |
| $SiO_2/(Li_2O + Na_2O + K_2O)$ | 8.69 | 12.89 | 9.50 | 7.13 | 11.40 | 14.50 | 8.41 |
| $(SiO_2 + ZrO_2)/Al_2O_3$ | 3.32 | 4.64 | 3.35 | 3.20 | 3.17 | 5.45 | 3.87 |
| $Li_2O/(Li_2O + Na_2O + K_2O)$ | 0.31 | 0.44 | 0.33 | 0.50 | 0.80 | 0.38 | 0.29 |
| $Na_2O/(Li_2O + Na_2O + K_2O)$ | 0.54 | 0.56 | 0.67 | 0.50 | 0.20 | 0.63 | 0.71 |
| $SnO_2 + CeO_2$ | 0.30 | 0.20 | 0.30 | 0.20 | 0.40 | 0.30 | 0.30 |
| $SnO_2/CeO_2$ | 0.50 | 1.00 | 0.50 | 1.00 | 3.00 | 2.00 | 2.00 |
| $(TiO_2 + Al_2O_3)/(MgO + CaO)$ | 0.960 | 0.573 | 0.863 | 1.677 | 1.136 | 0.507 | 0.758 |
| $(MgO + CaO)/(MgO + CaO + SrO + BaO)$ | 0.898 | 1.000 | 1.000 | 1.000 | 1.000 | 0.956 | 1.000 |
| $MgO/(MgO + CaO + SrO + BaO)$ | 0.51 | 0.55 | 0.51 | 0.77 | 0.57 | 0.48 | 0.51 |
| $BaO/(MgO + CaO + SrO + BaO)$ | 0.00 | 0.00 | 0.00 | 0.00 | 0.00 | 0.00 | 0.00 |
| $MgO + 0.7CaO + Li_2O + TiO_2 + ZrO_2$ | 17.39 | 20.86 | 18.79 | 20.10 | 21.32 | 21.99 | 18.86 |
| $P_2O_5/(B_2O_3 + SiO_2 + Al_2O_3 + P_2O_5)$ | 0.000 | 0.000 | 0.000 | 0.000 | 0.000 | 0.000 | 0.000 |
| $5Li_2O + 3Na_2O + 3K_2O + 2B_2O_3 + MgO + 2CaO + 3SrO + BaO$ | 54.90 | 54.90 | 51.40 | 48.00 | 48.20 | 54.40 | 54.30 |
| $SiO_2 + Al_2O_3 + B_2O_3 + P_2O_5 + 1.5Na_2O + 1.5K_2O + 2SrO + 3BaO + ZnO$ | 84.25 | 77.15 | 80.00 | 80.80 | 76.50 | 76.75 | 80.35 |
| $SiO_2 + Al_2O_3 + B_2O_3 + P_2O_5 + Na_2O + K_2O + CaO + 2SrO + 3BaO$ | 89.70 | 85.70 | 87.70 | 81.80 | 83.60 | 86.20 | 87.70 |
| Tg(° C.) | 685 | 714 | 688 | 670 | 692 | 700 | 685 |
| $\alpha(*10^{-7}/°$ C.) | 64.3 | 41.2 | 62.5 | 67.4 | 55.1 | 53.4 | 60.9 |
| Specific gravity | 2.66 | 2.51 | 2.61 | 2.59 | 2.63 | 2.59 | 2.59 |
| Young's modulus (GPa) | 91.3 | 90.5 | 92.3 | 91.2 | 97.5 | 90.5 | 90.3 |
| Specific elastic modulus (MNm/kg) | 34.3 | 36.0 | 35.4 | 35.3 | 37.1 | 34.9 | 34.8 |
| 1300° C. and 16 hour holding test | A | A | A | A | A | A | A |
| 1250° C. and 16 hour holding test | A | A | A | A |  | A | C |
| Bubble density rank | A | B | A | A | S | A | S |
| Natural log lnp of specific electrical resistance ρ (1450° C.) | | | | | | | |

TABLE 3

| No. | 16 | 17 | 18 | 19 | 20 | 21 | 22 |
|---|---|---|---|---|---|---|---|
| $SiO_2$ | 58.00 | 59.50 | 59.35 | 60.00 | 60.00 | 60.00 | 60.40 |
| $Al_2O_3$ | 15.00 | 15.90 | 15.05 | 13.00 | 13.00 | 13.00 | 14.12 |
| $B_2O_3$ | 0.00 | 0.50 | 0.18 | 0.00 | 0.00 | 0.00 | 0.20 |
| MgO | 10.00 | 10.00 | 9.80 | 10.00 | 10.00 | 12.00 | 11.81 |
| CaO | 9.60 | 9.80 | 9.83 | 9.60 | 9.70 | 9.70 | 7.78 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |

TABLE 3-continued

|  | | | | | | | |
|---|---|---|---|---|---|---|---|
| ZnO | 0.00 | 0.00 | 0.00 | 0.00 | 0.00 | 0.00 | 0.00 |
| ZrO$_2$ | 0.00 | 0.00 | 0.00 | 0.00 | 0.00 | 0.00 | 0.00 |
| Li$_2$O | 2.50 | 2.00 | 4.69 | 2.00 | 2.00 | 1.50 | 4.59 |
| Na$_2$O | 4.00 | 2.00 | 0.00 | 2.00 | 5.00 | 3.50 | 0.00 |
| K$_2$O | 0.50 | 0.00 | 0.00 | 0.00 | 0.00 | 0.00 | 0.00 |
| TiO$_2$ | 0.00 | 0.00 | 0.78 | 3.00 | 0.00 | 0.00 | 0.76 |
| Y$_2$O$_3$ | 0.00 | 0.00 | 0.00 | 0.00 | 0.00 | 0.00 | 0.00 |
| P$_2$O$_5$ | 0.00 | 0.00 | 0.00 | 0.00 | 0.00 | 0.00 | 0.00 |
| SnO$_2$ | 0.30 | 0.10 | 0.18 | 0.30 | 0.10 | 0.10 | 0.21 |
| CeO$_2$ | 0.10 | 0.10 | 0.14 | 0.10 | 0.20 | 0.20 | 0.13 |
| Sb$_2$O$_3$ | 0.00 | 0.10 | 0.00 | 0.00 | 0.00 | 0.00 | 0.00 |
| Total | 100.00 | 100.00 | 100.00 | 100.00 | 100.00 | 100.00 | 100.00 |

| No. | 23 | 24 | 25 | 26 | 27 | 28 | 29 | 30 |
|---|---|---|---|---|---|---|---|---|
| SiO$_2$ | 60.11 | 59.59 | 59.47 | 60.00 | 60.00 | 60.00 | 60.00 | 60.00 |
| Al$_2$O$_3$ | 15.19 | 15.29 | 15.20 | 15.00 | 15.00 | 15.00 | 14.90 | 15.10 |
| B$_2$O$_3$ | 0.18 | 0.18 | 0.18 | 0.00 | 0.00 | 0.00 | 0.00 | 0.00 |
| MgO | 9.85 | 9.84 | 9.82 | 10.00 | 10.00 | 10.00 | 10.00 | 10.00 |
| CaO | 9.82 | 9.81 | 9.74 | 9.80 | 9.80 | 7.50 | 9.90 | 10.00 |
| SrO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| ZrO$_2$ | 0.00 | 0.00 | 0.00 | 0.00 | 0.00 | 1.00 | 0.00 | 0.00 |
| Li$_2$O | 3.77 | 4.19 | 4.49 | 1.00 | 5.00 | 1.00 | 4.80 | 4.60 |
| Na$_2$O | 0.00 | 0.00 | 0.00 | 4.00 | 0.00 | 5.00 | 0.00 | 0.00 |
| K$_2$O | 0.00 | 0.00 | 0.00 | 0.00 | 0.00 | 0.00 | 0.00 | 0.00 |
| TiO$_2$ | 0.78 | 0.78 | 0.78 | 0.00 | 0.00 | 0.00 | 0.00 | 0.00 |
| Y$_2$O$_3$ | 0.00 | 0.00 | 0.00 | 0.00 | 0.00 | 0.00 | 0.00 | 0.00 |
| P$_2$O$_5$ | 0.00 | 0.00 | 0.00 | 0.00 | 0.00 | 0.00 | 0.00 | 0.00 |
| SnO$_2$ | 0.10 | 0.18 | 0.18 | 0.10 | 0.10 | 0.30 | 0.20 | 0.10 |
| CeO$_2$ | 0.20 | 0.14 | 0.14 | 0.10 | 0.10 | 0.20 | 0.10 | 0.20 |
| Sb$_2$O$_3$ | 0.00 | 0.00 | 0.00 | 0.00 | 0.00 | 0.10 | 0.00 | 0.00 |
| Total | 100.00 | 100.00 | 100.00 | 100.00 | 100.00 | 100.00 | 100.00 | 100.00 |

TABLE 4

| No. | 16 | 17 | 18 | 19 | 20 | 21 | 22 | 23 |
|---|---|---|---|---|---|---|---|---|
| SiO$_2$ + Al$_2$O$_3$ | 73.00 | 75.40 | 74.40 | 73.00 | 73.00 | 73.00 | 74.52 | 75.30 |
| MgO + CaO | 19.60 | 19.80 | 19.63 | 19.60 | 19.70 | 21.70 | 19.59 | 19.67 |
| MgO + CaO + SrO + BaO | 19.60 | 19.80 | 19.63 | 19.60 | 19.70 | 21.70 | 19.59 | 19.67 |
| CaO/MgO | 0.960 | 0.980 | 1.003 | 0.960 | 0.970 | 0.808 | 0.659 | 0.997 |
| Li$_2$O + Na$_2$O + K$_2$O | 7.00 | 4.00 | 4.69 | 4.00 | 7.00 | 5.00 | 4.59 | 3.77 |
| Na$_2$O/Li$_2$O | 1.60 | 1.00 | 0.00 | 1.00 | 2.50 | 2.33 | 0.00 | 0.00 |
| (CaO + Na$_2$O)/(MgO + Li$_2$O) | 1.09 | 0.98 | 0.68 | 0.97 | 1.23 | 0.98 | 0.47 | 0.72 |
| Li$_2$O/MgO + CaO) | 0.13 | 0.10 | 0.24 | 0.10 | 0.10 | 0.07 | 0.23 | 0.19 |
| 4Li$_2$O + 2Na$_2$O + K$_2$O | 18.50 | 12.00 | 18.76 | 12.00 | 18.00 | 13.00 | 18.36 | 15.08 |
| SiO$_2$/(Li$_2$O + Na$_2$O + K$_2$O) | 8.29 | 14.88 | 12.65 | 15.00 | 8.57 | 12.00 | 13.16 | 15.94 |
| (SiO$_2$ + ZrO$_2$)/Al$_2$O$_3$ | 3.87 | 3.74 | 3.94 | 4.62 | 4.62 | 4.62 | 4.28 | 3.96 |
| Li$_2$O/(Li$_2$O + Na$_2$O + K$_2$O) | 0.36 | 0.50 | 1.00 | 0.50 | 0.29 | 0.30 | 1.00 | 1.00 |
| Na$_2$O/(Li$_2$O + Na$_2$O + K$_2$O) | 0.57 | 0.50 | 0.00 | 0.50 | 0.71 | 0.70 | 0.00 | 0.00 |
| SnO$_2$ + CeO$_2$ | 0.40 | 0.20 | 0.32 | 0.40 | 0.30 | 0.30 | 0.34 | 0.30 |
| SnO$_2$/CeO$_2$ | 3.00 | 1.00 | 1.29 | 3.00 | 0.50 | 0.50 | 1.62 | 0.50 |
| (TiO$_2$ + Al$_2$O$_3$)/(MgO + CaO) | 0.765 | 0.803 | 0.806 | 0.816 | 0.660 | 0.599 | 0.760 | 0.812 |
| (MgO + CaO)/(MgO + CaO + SrO + BaO) | 1.000 | 1.000 | 1.000 | 1.000 | 1.000 | 1.000 | 1.000 | 1.000 |
| MgO/(MgO + CaO + SrO + BaO) | 0.51 | 0.51 | 0.50 | 0.51 | 0.51 | 0.55 | 0.60 | 0.50 |
| BaO/(MgO + CaO + SrO + BaO) | 0.00 | 0.00 | 0.00 | 0.00 | 0.00 | 0.00 | 0.00 | 0.00 |
| MgO + 0.7CaO + Li$_2$O + TiO$_2$ + ZrO$_2$ | 19.22 | 18.86 | 22.15 | 21.72 | 18.79 | 20.29 | 22.61 | 21.27 |
| P$_2$O$_5$/(B$_2$O$_3$ + SiO$_2$ + Al$_2$O$_3$ + P$_2$O$_5$) | 0.000 | 0.000 | 0.000 | 0.000 | 0.000 | 0.000 | 0.000 | 0.000 |
| 5Li$_2$O + 3Na$_2$O + 3K$_2$O + 2B$_2$O$_3$ + MgO + 2CaO + 3SrO + BaO | 55.20 | 46.60 | 53.27 | 45.20 | 54.40 | 49.40 | 50.72 | 48.70 |
| SiO$_2$ + Al$_2$O$_3$ + B$_2$O$_3$ + P$_2$O$_5$ + 1.5Na$_2$O + 1.5K$_2$O + 2SrO + 3BaO + ZnO | 79.75 | 78.90 | 74.58 | 76.00 | 80.50 | 78.25 | 74.72 | 75.48 |
| SiO$_2$ + Al$_2$O$_3$ + B$_2$O$_3$ + P$_2$O$_5$ + Na$_2$O + K$_2$O + CaO + 2SrO + 3BaO | 87.10 | 87.70 | 84.41 | 84.60 | 87.70 | 86.20 | 82.50 | 85.30 |
| Tg (° C.) | 690 | 705 | 698 | 715 | 680 | 718 | 694 | 704 |
| α(*10$^{-7}$/° C.) | 59.8 | 49.5 | 51.0 | 50.2 | 61.5 | 53.1 | 49.5 | 51.7 |
| Specific gravity | 2.60 | 2.57 | 2.59 | 2.61 | 2.58 | 2.60 | 2.58 | 2.59 |
| Young's modulus (GPa) | 91.8 | 91.1 | 95.1 | 91.8 | 90.5 | 90.7 | 96.2 | 95.5 |
| Specific elastic modulus (MNm/kg) | 35.3 | 35.5 | 36.7 | 35.2 | 35.1 | 34.9 | 37.3 | 36.9 |

TABLE 4-continued

| | | | | | | | | |
|---|---|---|---|---|---|---|---|---|
| 1300° C. and 16 hour holding test | A | A | A | A | A | A | A | A |
| 1250° C. and 16 hour holding test | A | A | A | | B | B | A | B |
| Bubble density rank | S | B | S | A | A | B | S | A |
| Natural log lnρ of specific electrical resistance ρ (1450° C.) | | | 1.946 | | | | | |

| No. | 24 | 25 | 26 | 27 | 28 | 29 | 30 |
|---|---|---|---|---|---|---|---|
| $SiO_2 + Al_2O_3$ | 74.88 | 74.67 | 75.00 | 75.00 | 75.00 | 74.90 | 75.10 |
| $MgO + CaO$ | 19.65 | 19.56 | 19.80 | 19.80 | 17.50 | 19.90 | 20.00 |
| $MgO + CaO + SrO + BaO$ | 19.65 | 19.56 | 19.80 | 19.80 | 17.50 | 19.90 | 20.00 |
| $CaO/MgO$ | 0.997 | 0.992 | 0.980 | 0.980 | 0.750 | 0.990 | 1.000 |
| $Li_2O + Na_2O + K_2O$ | 4.19 | 4.49 | 5.00 | 5.00 | 6.00 | 4.80 | 4.60 |
| $Na_2O/Li_2O$ | 0.00 | 0.00 | 4.00 | 0.00 | 5.00 | 0.00 | 0.00 |
| $(CaO + Na_2O)/(MgO + Li_2O)$ | 0.70 | 0.68 | 1.25 | 0.65 | 1.14 | 0.67 | 0.68 |
| $Li_2O/MgO + CaO)$ | 0.21 | 0.23 | 0.05 | 0.25 | 0.06 | 0.24 | 0.23 |
| $4Li_2O + 2Na_2O + K_2O$ | 16.76 | 17.96 | 12.00 | 20.00 | 14.00 | 19.20 | 18.40 |
| $SiO_2/(Li_2O + Na_2O + K_2O)$ | 14.22 | 13.24 | 12.00 | 12.00 | 10.00 | 12.50 | 13.04 |
| $(SiO_2 + ZrO_2)/Al_2O_3$ | 3.90 | 3.91 | 4.00 | 4.00 | 4.07 | 4.03 | 3.97 |
| $Li_2O/(Li_2O + Na_2O + K_2O)$ | 1.00 | 1.00 | 0.20 | 1.00 | 0.17 | 1.00 | 1.00 |
| $Na_2O/(Li_2O + Na_2O + K_2O)$ | 0.00 | 0.00 | 0.80 | 0.00 | 0.83 | 0.00 | 0.00 |
| $SnO_2 + CeO_2$ | 0.32 | 0.32 | 0.20 | 0.20 | 0.50 | 0.30 | 0.30 |
| $SnO_2/CeO_2$ | 1.29 | 1.29 | 1.00 | 1.00 | 1.50 | 2.00 | 0.50 |
| $(TiO_2 + Al_2O_3)/(MgO + CaO)$ | 0.818 | 0.817 | 0.758 | 0.758 | 0.857 | 0.749 | 0.755 |
| $(MgO + CaO)/(MgO + CaO + SrO + BaO)$ | 1.000 | 1.000 | 1.000 | 1.000 | 1.000 | 1.000 | 1.000 |
| $MgO/(MgO + CaO + SrO + BaO)$ | 0.50 | 0.50 | 0.51 | 0.51 | 0.57 | 0.50 | 0.50 |
| $BaO/(MgO + CaO + SrO + BaO)$ | 0.00 | 0.00 | 0.00 | 0.00 | 0.00 | 0.00 | 0.00 |
| $MgO + 0.7CaO + Li_2O + TiO_2 + ZrO_2$ | 21.68 | 21.91 | 17.86 | 21.86 | 17.25 | 21.73 | 21.60 |
| $P_2O_5/(B_2O_3 + SiO_2 + Al_2O_3 + P_2O_5)$ | 0.000 | 0.000 | 0.000 | 0.000 | 0.000 | 0.000 | 0.000 |
| $5Li_2O + 3Na_2O + 3K_2O + 2B_2O_3 + MgO + 2CaO + 3SrO + BaO$ | 50.77 | 52.11 | 46.60 | 54.60 | 45.00 | 53.80 | 53.00 |
| $SiO_2 + Al_2O_3 + B_2O_3 + P_2O_5 + 1.5Na_2O + 1.5K_2O + 2SrO + 3BaO + ZnO$ | 75.06 | 74.85 | 81.00 | 75.00 | 82.50 | 74.90 | 75.10 |
| $SiO_2 + Al_2O_3 + B_2O_3 + P_2O_5 + Na_2O + K_2O + CaO + 2SrO + 3BaO$ | 84.87 | 84.59 | 88.80 | 84.80 | 87.50 | 84.80 | 85.10 |
| $Tg(°C.)$ | 696 | 695 | 725 | 685 | 709 | 691 | 694 |
| $\alpha(*10^{-7}/°C.)$ | 51.9 | 51.0 | 56.7 | 55.6 | 56.6 | 50.6 | 49.0 |
| Specific gravity | 2.59 | 2.59 | 2.58 | 2.58 | 2.58 | 2.58 | 2.58 |
| Young's modulus (GPa) | 95.3 | 95.9 | 90.5 | 94.6 | 90.1 | 94.6 | 94.9 |
| Specific elastic modulus (MNm/kg) | 36.8 | 37.0 | 35.1 | 36.7 | 34.9 | 36.6 | 36.8 |
| 1300° C. and 16 hour holding test | A | A | A | A | A | A | A |
| 1250° C. and 16 hour holding test | A | A | A | A | B | A | A |
| Bubble density rank | S | S | B | A | A | S | A |
| Natural log lnρ of specific electrical resistance ρ (1450° C.) | | | 2.833 | 1.705 | | | |

TABLE 5

| No. | 31 | 32 | 33 | 34 | 35 | 36 | 37 |
|---|---|---|---|---|---|---|---|
| $SiO_2$ | 60.00 | 60.00 | 59.79 | 60.00 | 60.00 | 60.00 | 60.00 |
| $Al_2O_3$ | 15.00 | 15.00 | 15.46 | 16.00 | 17.00 | 16.70 | 17.00 |
| $B_2O_3$ | 0.00 | 0.00 | 0.18 | 1.50 | 0.00 | 0.00 | 0.00 |
| MgO | 12.00 | 14.00 | 9.87 | 10.00 | 10.00 | 10.00 | 10.00 |
| CaO | 7.70 | 5.70 | 9.60 | 9.30 | 8.70 | 9.80 | 7.80 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| $ZrO_2$ | 0.00 | 0.00 | 0.00 | 0.00 | 0.00 | 0.00 | 0.00 |
| $Li_2O$ | 1.50 | 2.50 | 3.78 | 2.50 | 1.00 | 3.00 | 2.00 |
| $Na_2O$ | 3.50 | 2.50 | 0.00 | 0.50 | 3.00 | 0.00 | 3.00 |
| $K_2O$ | 0.00 | 0.00 | 0.00 | 0.00 | 0.00 | 0.00 | 0.00 |
| $TiO_2$ | 0.00 | 0.00 | 0.78 | 0.00 | 0.00 | 0.00 | 0.00 |
| $Y_2O_3$ | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 |
| $SnO_2$ | 0.20 | 0.20 | 0.40 | 0.10 | 0.20 | 0.40 | 0.10 |
| $CeO_2$ | 0.10 | 0.10 | 0.14 | 0.10 | 0.10 | 0.10 | 0.10 |
| $Sb_2O_3$ | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

| No. | 38 | 39 | 40 | 41 | 42 | 43 | 44 | 45 |
|---|---|---|---|---|---|---|---|---|
| $SiO_2$ | 60.60 | 60.62 | 60.57 | 60.61 | 60.60 | 60.61 | 60.60 | 60.63 |
| $Al_2O_3$ | 13.09 | 13.12 | 14.12 | 14.12 | 14.12 | 13.90 | 14.12 | 14.00 |
| $B_2O_3$ | 0.00 | 0.00 | 0.00 | 0.00 | 0.00 | 0.00 | 0.00 | 0.00 |
| MgO | 9.81 | 10.81 | 9.81 | 10.81 | 9.81 | 9.81 | 11.40 | 12.81 |

TABLE 5-continued

| CaO | 10.20 | 9.60 | 9.40 | 9.10 | 8.78 | 9.00 | 7.78 | 7.20 |
|---|---|---|---|---|---|---|---|---|
| SrO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $ZrO_2$ | 0.00 | 0.00 | 0.00 | 0.00 | 0.00 | 1.00 | 0.00 | 0.00 |
| $Li_2O$ | 4.20 | 4.59 | 5.00 | 4.20 | 4.59 | 4.59 | 5.00 | 4.20 |
| $Na_2O$ | 0.00 | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 | 0.00 |
| $TiO_2$ | 1.76 | 0.76 | 0.76 | 0.76 | 1.76 | 0.76 | 0.76 | 0.76 |
| $Y_2O_3$ | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 |
| $SnO_2$ | 0.21 | 0.30 | 0.21 | 0.20 | 0.21 | 0.20 | 0.21 | 0.30 |
| $CeO_2$ | 0.13 | 0.20 | 0.13 | 0.10 | 0.13 | 0.13 | 0.13 | 0.10 |
| $Sb_2O_3$ | 0.00 | 0.00 | 0.00 | 0.10 | 0.00 | 0.00 | 0.00 | 0.00 |
| Total | 100.00 | 100.00 | 100.00 | 100.00 | 100.00 | 100.00 | 100.00 | 100.00 |

TABLE 6

| No. | 31 | 32 | 33 | 34 | 35 | 36 | 37 | 38 |
|---|---|---|---|---|---|---|---|---|
| $SiO_2 + Al_2O_3$ | 75.00 | 75.00 | 75.25 | 76.00 | 77.00 | 76.70 | 77.00 | 73.69 |
| MgO + CaO | 19.70 | 19.70 | 19.47 | 19.30 | 18.70 | 19.80 | 17.80 | 20.01 |
| MgO + CaO + SrO + BaO | 19.70 | 19.70 | 19.47 | 19.30 | 18.70 | 19.80 | 17.80 | 20.01 |
| CaO/MgO | 0.642 | 0.407 | 0.973 | 0.930 | 0.870 | 0.980 | 0.780 | 1.040 |
| $Li_2O + Na_2O + K_2O$ | 5.00 | 5.00 | 3.78 | 3.00 | 4.00 | 3.00 | 5.00 | 4.20 |
| $Na_2O/Li_2O$ | 2.33 | 1.00 | 0.00 | 0.20 | 3.00 | 0.00 | 1.50 | 0.00 |
| $(CaO + Na_2O)/(MgO + Li_2O)$ | 0.83 | 0.50 | 0.70 | 0.78 | 1.06 | 0.75 | 0.90 | 0.73 |
| $Li_2O/(MgO + CaO)$ | 0.08 | 0.13 | 0.19 | 0.13 | 0.05 | 0.15 | 0.11 | 0.21 |
| $4Li_2O + 2Na_2O + K_2O$ | 13.00 | 15.00 | 15.12 | 11.00 | 10.00 | 12.00 | 14.00 | 16.80 |
| $SiO_2/(Li_2O + Na_2O + K_2O)$ | 12.00 | 12.00 | 15.82 | 20.00 | 15.00 | 20.00 | 12.00 | 14.43 |
| $(SiO_2 + ZrO_2)/Al_2O_3$ | 4.00 | 4.00 | 3.87 | 3.75 | 3.53 | 3.59 | 3.53 | 4.63 |
| $Li_2O/(Li_2O + Na_2O + K_2O)$ | 0.30 | 0.50 | 1.00 | 0.83 | 0.25 | 1.00 | 0.40 | 1.00 |
| $Na_2O/(Li_2O + Na_2O + K_2O)$ | 0.70 | 0.50 | 0.00 | 0.17 | 0.75 | 0.00 | 0.60 | 0.00 |
| $SnO_2 + CeO_2$ | 0.30 | 0.30 | 0.54 | 0.20 | 0.50 | 0.50 | 0.20 | 0.34 |
| $SnO_2/CeO_2$ | 2.00 | 2.00 | 2.86 | 1.00 | 2.00 | 4.00 | 1.00 | 1.62 |
| $(TiO_2 + Al_2O_3)/(MgO + CaO)$ | 0.761 | 0.761 | 0.834 | 0.829 | 0.909 | 0.843 | 0.955 | 0.742 |
| $(MgO + CaO)/(MgO + CaO + SrO + BaO)$ | 1.000 | 1.000 | 1.000 | 1.000 | 1.000 | 1.000 | 1.000 | 1.000 |
| $MgO/(MgO + CaO + SrO + BaO)$ | 0.61 | 0.71 | 0.51 | 0.52 | 0.53 | 0.51 | 0.56 | 0.49 |
| $BaO/(MgO + CaO + SrO + BaO)$ | 0.00 | 0.00 | 0.00 | 0.00 | 0.00 | 0.00 | 0.00 | 0.00 |
| $MgO + 0.7CaO + Li_2O + TiO_2 + ZrO_2$ | 18.89 | 20.49 | 21.15 | 19.01 | 17.09 | 19.86 | 17.46 | 22.91 |
| $P_2O_5/(B_2O_3 + SiO_2 + Al_2O_3 + P_2O_5)$ | 0.000 | 0.000 | 0.000 | 0.000 | 0.000 | 0.000 | 0.000 | 0.000 |
| $5Li_2O + 3Na_2O + 3K_2O + 2B_2O_3 + MgO + 2CaO + 3SrO + BaO$ | 45.40 | 45.40 | 48.33 | 45.60 | 41.40 | 44.60 | 44.60 | 51.21 |
| $SiO_2 + Al_2O_3 + B_2O_3 + P_2O_5 + 1.5Na_2O + 1.5K_2O + 2SrO + 3BaO + ZnO$ | 80.25 | 78.75 | 75.43 | 78.25 | 81.50 | 76.70 | 81.50 | 73.69 |
| $SiO_2 + Al_2O_3 + B_2O_3 + P_2O_5 + Na_2O + K_2O + CaO + 2SrO + 3BaO$ | 86.20 | 83.20 | 85.03 | 87.30 | 88.70 | 86.50 | 87.80 | 83.89 |
| Tg(° C.) | 728 | 717 | 704 | 728 | 741 | 731 | 717 | 690 |
| $\alpha(*10^{-7}/° C.)$ | 59.2 | 51.7 | 51.0 | 44.8 | 51.5 | 43.8 | 55.5 | 51.5 |
| Specific gravity | 2.57 | 2.57 | 2.60 | 2.57 | 2.59 | 2.59 | 2.57 | 2.59 |
| Young's modulus (GPa) | 90.3 | 91.2 | 94.3 | 93.2 | 91 | 95.9 | 91.5 | 94.8 |
| Specific elastic modulus (MNm/kg) | 35.1 | 35.5 | 36.3 | 36.2 | 35.2 | 37.1 | 35.6 | 36.6 |
| 1300° C. and 16 hour holding test | A | A | A | A | A | A | A | A |
| 1250° C. and 16 hour holding test | B | B | A |  |  |  | A | A |
| Bubble density rank | A | S | S | B | A | A | B | S |
| Natural log lnρ of specific electrical resistance ρ(1450° C.) |  |  |  |  |  |  |  |  |

| No. | 39 | 40 | 41 | 42 | 43 | 44 | 45 |
|---|---|---|---|---|---|---|---|
| $SiO_2 + Al_2O_3$ | 73.74 | 74.69 | 74.73 | 74.72 | 74.51 | 74.72 | 74.63 |
| MgO + CaO | 20.41 | 19.21 | 19.91 | 18.59 | 18.81 | 19.18 | 20.01 |
| MgO + CaO + SrO + BaO | 20.41 | 19.21 | 19.91 | 18.59 | 18.81 | 19.18 | 20.01 |
| CaO/MgO | 0.888 | 0.958 | 0.842 | 0.895 | 0.917 | 0.682 | 0.562 |
| $Li_2O + Na_2O + K_2O$ | 4.59 | 5.00 | 4.20 | 4.59 | 4.59 | 5.00 | 4.20 |
| $Na_2O/Li_2O$ | 0.00 | 0.00 | 0.00 | 0.00 | 0.00 | 0.00 | 0.00 |
| $(CaO + Na_2O)/(MgO + Li_2O)$ | 0.62 | 0.63 | 0.61 | 0.61 | 0.63 | 0.47 | 0.42 |
| $Li_2O/(MgO + CaO)$ | 0.22 | 0.26 | 0.21 | 0.25 | 0.24 | 0.26 | 0.21 |
| $4Li_2O + 2Na_2O + K_2O$ | 18.36 | 20.00 | 16.80 | 18.36 | 18.36 | 20.00 | 16.80 |
| $SiO_2/(Li_2O + Na_2O + K_2O)$ | 13.21 | 12.11 | 14.43 | 13.20 | 13.20 | 12.12 | 14.44 |
| $(SiO_2 + ZrO_2)/Al_2O_3$ | 4.62 | 4.29 | 4.29 | 4.29 | 4.43 | 4.29 | 4.33 |
| $Li_2O/(Li_2O + Na_2O + K_2O)$ | 1.00 | 1.00 | 1.00 | 1.00 | 1.00 | 1.00 | 1.00 |
| $Na_2O/(Li_2O + Na_2O + K_2O)$ | 0.00 | 0.00 | 0.00 | 0.00 | 0.00 | 0.00 | 0.00 |
| $SnO_2 + CeO_2$ | 0.50 | 0.34 | 0.30 | 0.34 | 0.33 | 0.34 | 0.40 |
| $SnO_2/CeO_2$ | 1.50 | 1.62 | 2.00 | 1.62 | 1.54 | 1.62 | 3.00 |
| $(TiO_2 + Al_2O_3)/(MgO + CaO)$ | 0.680 | 0.775 | 0.747 | 0.854 | 0.779 | 0.776 | 0.738 |

TABLE 6-continued

|  |  |  |  |  |  |  |  |
|---|---|---|---|---|---|---|---|
| (MgO + CaO)/(MgO + CaO + SrO + BaO) | 1.000 | 1.000 | 1.000 | 1.000 | 1.000 | 1.000 | 1.000 |
| MgO/(MgO + CaO + SrO + BaO) | 0.53 | 0.51 | 0.54 | 0.53 | 0.52 | 0.59 | 0.64 |
| BaO/(MgO + CaO + SrO + BaO) | 0.00 | 0.00 | 0.00 | 0.00 | 0.00 | 0.00 | 0.00 |
| $MgO + 0.7CaO + Li_2O + TiO_2 + ZrO_2$ | 22.88 | 22.15 | 22.14 | 22.31 | 22.46 | 22.61 | 22.81 |
| $P_2O_5/(B_2O_3 + SiO_2 + Al_2O_3 + P_2O_5)$ | 0.000 | 0.000 | 0.000 | 0.000 | 0.000 | 0.000 | 0.000 |
| $5Li_2O + 3Na_2O + 3K_2O + 2B_2O_3 + MgO + 2CaO + 3SrO + BaO$ | 52.96 | 53.61 | 50.01 | 50.32 | 50.76 | 51.96 | 48.21 |
| $SiO_2 + Al_2O_3 + B_2O_3 + P_2O_5 + 1.5Na_2O + 1.5K_2O + 2SrO + 3BaO + ZnO$ | 73.74 | 74.69 | 74.73 | 74.72 | 74.51 | 74.72 | 74.63 |
| $SiO_2 + Al_2O_3 + B_2O_3 + P_2O_5 + Na_2O + K_2O + CaO + 2SrO + 3BaO$ | 83.34 | 84.09 | 83.83 | 83.50 | 83.51 | 82.50 | 81.83 |
| Tg(° C.) | 682 | 680 | 695 | 690 | 700 | 690 | 700 |
| $\alpha$ (*$10^{-7}$/° C.) | 53.2 | 53.2 | 49.2 | 49.9 | 49.4 | 50.2 | 47.5 |
| Specific gravity | 2.59 | 2.59 | 2.58 | 2.59 | 2.61 | 2.58 | 2.58 |
| Young's modulus (GPa) | 95 | 94.5 | 95.3 | 95.4 | 96 | 96.2 | 96.4 |
| Specific elastic modulus (MNm/kg) | 36.7 | 36.5 | 36.9 | 36.8 | 36.8 | 37.3 | 37.4 |
| 1300° C. and 16 hour holding test | A | A | A | A | A | A | A |
| 1250° C. and 16 hour holding test | A | A | A | A | A |  |  |
| Bubble density rank | S | S | S | S | S | S | S |
| Natural log lnp of specific electrical resistance ρ(1450° C.) |  |  |  |  |  | 1.792 |  |

TABLE 7

| No. | 46 | 47 | 48 | 49 | 50 | 51 | 52 |
|---|---|---|---|---|---|---|---|
| $SiO_2$ | 60.60 | 60.60 | 60.79 | 60.60 | 61.65 | 61.60 | 61.60 |
| $Al_2O_3$ | 15.12 | 15.20 | 15.25 | 15.62 | 10.80 | 11.12 | 13.16 |
| $B_2O_3$ | 0.00 | 0.00 | 0.18 | 0.00 | 0.00 | 0.00 | 0.00 |
| MgO | 10.81 | 10.30 | 9.89 | 10.31 | 10.00 | 11.81 | 9.81 |
| CaO | 7.78 | 7.80 | 9.86 | 7.78 | 9.90 | 9.78 | 9.78 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| $ZrO_2$ | 0.00 | 0.00 | 0.00 | 0.00 | 0.00 | 0.00 | 0.00 |
| $Li_2O$ | 4.59 | 5.00 | 2.95 | 4.59 | 4.59 | 4.59 | 4.59 |
| $Na_2O$ | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 |
| $TiO_2$ | 0.76 | 0.76 | 0.78 | 0.76 | 2.76 | 0.76 | 0.76 |
| $Y_2O_3$ | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 |
| $SnO_2$ | 0.21 | 0.21 | 0.10 | 0.21 | 0.20 | 0.21 | 0.10 |
| $CeO_2$ | 0.13 | 0.13 | 0.20 | 0.13 | 0.10 | 0.13 | 0.20 |
| $Sb_2O_3$ | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |

| No. | 53 | 54 | 55 | 56 | 57 | 58 | 59 | 60 |
|---|---|---|---|---|---|---|---|---|
| $SiO_2$ | 61.60 | 61.64 | 61.62 | 61.60 | 61.64 | 61.60 | 61.43 | 61.20 |
| $Al_2O_3$ | 13.12 | 13.12 | 13.12 | 13.15 | 13.12 | 14.70 | 15.00 | 15.24 |
| $B_2O_3$ | 0.00 | 0.00 | 0.00 | 0.00 | 0.00 | 0.00 | 0.00 | 0.00 |
| MgO | 11.81 | 9.81 | 9.81 | 12.50 | 13.81 | 11.80 | 11.80 | 12.80 |
| CaO | 7.78 | 7.78 | 7.60 | 7.10 | 5.78 | 5.80 | 4.80 | 3.80 |
| SrO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $ZrO_2$ | 0.00 | 0.00 | 2.00 | 0.00 | 0.00 | 0.00 | 0.00 | 0.00 |
| $Li_2O$ | 4.59 | 4.59 | 4.59 | 4.59 | 4.59 | 5.00 | 5.70 | 5.70 |
| $Na_2O$ | 0.00 | 0.00 | 0.00 | 0.00 | 0.00 | 0.00 | 0.00 | 0.00 |
| $K_2O$ | 0.00 | 0.00 | 0.00 | 0.00 | 0.00 | 0.00 | 0.00 | 0.00 |
| $TiO_2$ | 0.76 | 2.76 | 0.76 | 0.76 | 0.76 | 0.76 | 0.76 | 0.76 |
| $Y_2O_3$ | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 |
| $SnO_2$ | 0.21 | 0.10 | 0.30 | 0.20 | 0.20 | 0.21 | 0.21 | 0.20 |
| $CeO_2$ | 0.13 | 0.10 | 0.20 | 0.10 | 0.10 | 0.13 | 0.30 | 0.20 |
| $Sb_2O_3$ | 0.00 | 0.10 | 0.00 | 0.00 | 0.00 | 0.00 | 0.00 | 0.10 |
| Total | 100.00 | 100.00 | 100.00 | 100.00 | 100.00 | 100.00 | 100.00 | 100.00 |

TABLE 8

| No. | 46 | 47 | 48 | 49 | 50 | 51 | 52 | 53 |
|---|---|---|---|---|---|---|---|---|
| $SiO_2 + Al_2O_3$ | 75.72 | 75.80 | 76.04 | 76.22 | 72.45 | 72.72 | 74.76 | 74.72 |
| $MgO + CaO$ | 18.59 | 18.10 | 19.75 | 18.09 | 19.90 | 21.59 | 19.59 | 19.59 |
| $MgO + CaO + SrO + BaO$ | 18.59 | 18.10 | 19.75 | 18.09 | 19.90 | 21.59 | 19.59 | 19.59 |
| $CaO/MgO$ | 0.720 | 0.757 | 0.997 | 0.755 | 0.990 | 0.828 | 0.997 | 0.659 |
| $Li_2O + Na_2O + K_2O$ | 4.59 | 5.00 | 2.95 | 4.59 | 4.59 | 4.59 | 4.59 | 4.59 |
| $Na_2O/Li_2O$ | 0.00 | 0.00 | 0.00 | 0.00 | 0.00 | 0.00 | 0.00 | 0.00 |
| $(CaO + Na_2O)/(MgO + Li_2O)$ | 0.51 | 0.51 | 0.77 | 0.52 | 0.68 | 0.60 | 0.68 | 0.47 |
| $Li_2O/(MgO + CaO)$ | 0.25 | 0.28 | 0.15 | 0.25 | 0.23 | 0.21 | 0.23 | 0.23 |
| $4Li_2O + 2Na_2O + K_2O$ | 18.36 | 20.00 | 11.80 | 18.36 | 18.36 | 18.36 | 18.36 | 18.36 |
| $SiO_2/(Li_2O + Na_2O + K_2O)$ | 13.20 | 12.12 | 20.61 | 13.20 | 13.43 | 13.42 | 13.42 | 13.42 |
| $(SiO_2 + ZrO_2)/Al_2O_3$ | 4.01 | 3.99 | 3.99 | 3.88 | 5.71 | 5.54 | 4.68 | 4.70 |
| $Li_2O/(Li_2O + Na_2O + K_2O)$ | 1.00 | 1.00 | 1.00 | 1.00 | 1.00 | 1.00 | 1.00 | 1.00 |
| $Na_2O/(Li_2O + Na_2O + K_2O)$ | 0.00 | 0.00 | 0.00 | 0.00 | 0.00 | 0.00 | 0.00 | 0.00 |
| $SnO_2 + CeO_2$ | 0.34 | 0.34 | 0.30 | 0.34 | 0.30 | 0.34 | 0.30 | 0.34 |
| $SnO_2/CeO_2$ | 1.62 | 1.62 | 0.50 | 1.62 | 2.00 | 1.62 | 0.50 | 1.62 |
| $(TiO_2 + Al_2O_3)/(MgO + CaO)$ | 0.854 | 0.882 | 0.812 | 0.905 | 0.681 | 0.550 | 0.711 | 0.709 |
| $(MgO + CaO)/(MgO + CaO + SrO + BaO)$ | 1.000 | 1.000 | 1.000 | 1.000 | 1.000 | 1.000 | 1.000 | 1.000 |
| $MgO/(MgO + CaO + SrO + BaO)$ | 0.58 | 0.57 | 0.50 | 0.57 | 0.50 | 0.55 | 0.50 | 0.60 |
| $BaO/(MgO + CaO + SrO + BaO)$ | 0.00 | 0.00 | 0.00 | 0.00 | 0.00 | 0.00 | 0.00 | 0.00 |
| $MgO + 0.7CaO + Li_2O + TiO_2 + ZrO_2$ | 21.61 | 21.52 | 20.52 | 21.11 | 24.28 | 24.01 | 22.01 | 22.61 |
| $P_2O_5/(B_2O_3 + SiO_2 + Al_2O_3 + P_2O_5)$ | 0.000 | 0.000 | 0.000 | 0.000 | 0.000 | 0.000 | 0.000 | 0.000 |
| $5Li_2O + 3Na_2O + 3K_2O + 2B_2O_3 + MgO + 2CaO + 3SrO + BaO$ | 49.32 | 50.90 | 44.72 | 48.82 | 52.75 | 54.32 | 52.32 | 50.32 |
| $SiO_2 + Al_2O_3 + B_2O_3 + P_2O_5 + 1.5Na_2O + 1.5K_2O + 2SrO + 3BaO + ZnO$ | 75.72 | 75.80 | 76.22 | 76.22 | 72.45 | 72.72 | 74.76 | 74.72 |
| $SiO_2 + Al_2O_3 + B_2O_3 + P_2O_5 + Na_2O + K_2O + CaO + 2SrO + 3BaO$ | 83.50 | 83.60 | 86.08 | 84.00 | 82.35 | 82.50 | 84.54 | 82.50 |
| Tg(° C.) | 699 | 692 | 718 | 704 | 690 | 683 | 690 | 689 |
| $\alpha(*10^{-7}/°$ C.) | 47.6 | 49.0 | 49.1 | 47.9 | 51.6 | 52.6 | 51.3 | 49.8 |
| Specific gravity | 2.58 | 2.57 | 2.59 | 2.58 | 2.60 | 2.59 | 2.58 | 2.57 |
| Young's modulus (GPa) | 95.3 | 95.5 | 93.7 | 95.7 | 94.3 | 94.3 | 93.7 | 94.7 |
| Specific elastic modulus (MNm/kg) | 37.0 | 37.2 | 36.2 | 37.1 | 36.3 | 36.4 | 36.4 | 36.8 |
| 1300° C. and 16 hour holding test | A | A | A | A | A | A | A | A |
| 1250° C. and 16 hour holding test | | | B | | A | A | A | A |
| Bubble density rank | S | S | B | S | S | S | A | S |
| Natural log lnρ of specific electrical resistance ρ(1450° C.) | | | | | | | | |

| No. | 54 | 55 | 56 | 57 | 58 | 59 | 60 |
|---|---|---|---|---|---|---|---|
| $SiO_2 + Al_2O_3$ | 74.76 | 74.74 | 74.75 | 74.76 | 76.30 | 76.43 | 76.44 |
| $MgO + CaO$ | 17.59 | 17.41 | 19.60 | 19.59 | 17.60 | 16.60 | 16.60 |
| $MgO + CaO + SrO + BaO$ | 17.59 | 17.41 | 19.60 | 19.59 | 17.60 | 16.60 | 16.60 |
| $CaO/MgO$ | 0.793 | 0.775 | 0.568 | 0.419 | 0.492 | 0.407 | 0.297 |
| $Li_2O + Na_2O + K_2O$ | 4.59 | 4.59 | 4.59 | 4.59 | 5.00 | 5.70 | 5.70 |
| $Na_2O/Li_2O$ | 0.00 | 0.00 | 0.00 | 0.00 | 0.00 | 0.00 | 0.00 |
| $(CaO + Na_2O)/(MgO + Li_2O)$ | 0.54 | 0.53 | 0.42 | 0.31 | 0.35 | 0.27 | 0.21 |
| $Li_2O/(MgO + CaO)$ | 0.26 | 0.26 | 0.23 | 0.23 | 0.28 | 0.34 | 0.34 |
| $4Li_2O + 2Na_2O + K_2O$ | 18.36 | 18.36 | 18.36 | 18.36 | 20.00 | 22.80 | 22.80 |
| $SiO_2/(Li_2O + Na_2O + K_2O)$ | 13.43 | 13.42 | 13.42 | 13.43 | 12.32 | 10.78 | 10.74 |
| $(SiO_2 + ZrO_2)/Al_2O_3$ | 4.70 | 4.85 | 4.68 | 4.70 | 4.19 | 4.10 | 4.02 |
| $Li_2O/(Li_2O + Na_2O + K_2O)$ | 1.00 | 1.00 | 1.00 | 1.00 | 1.00 | 1.00 | 1.00 |
| $Na_2O/(Li_2O + Na_2O + K_2O)$ | 0.00 | 0.00 | 0.00 | 0.00 | 0.00 | 0.00 | 0.00 |
| $SnO_2 + CeO_2$ | 0.20 | 0.50 | 0.30 | 0.30 | 0.34 | 0.51 | 0.40 |
| $SnO_2/CeO_2$ | 1.00 | 1.50 | 2.00 | 2.00 | 1.62 | 0.70 | 1.00 |
| $(TiO_2 + Al_2O_3)/(MgO + CaO)$ | 0.903 | 0.797 | 0.710 | 0.709 | 0.878 | 0.949 | 0.964 |
| $(MgO + CaO)/(MgO + CaO + SrO + BaO)$ | 1.000 | 1.000 | 1.000 | 1.000 | 1.000 | 1.000 | 1.000 |
| $MgO/(MgO + CaO + SrO + BaO)$ | 0.56 | 0.56 | 0.64 | 0.70 | 0.67 | 0.71 | 0.77 |
| $BaO/(MgO + CaO + SrO + BaO)$ | 0.00 | 0.00 | 0.00 | 0.00 | 0.00 | 0.00 | 0.00 |
| $MgO + 0.7CaO + Li_2O + TiO_2 + ZrO_2$ | 22.61 | 22.48 | 22.82 | 23.21 | 21.62 | 21.62 | 21.92 |
| $P_2O_5/(B_2O_3 + SiO_2 + Al_2O_3 + P_2O_5)$ | 0.000 | 0.000 | 0.000 | 0.000 | 0.000 | 0.000 | 0.000 |
| $5Li_2O + 3Na_2O + 3K_2O + 2B_2O_3 + MgO + 2CaO + 3SrO + BaO$ | 48.32 | 47.96 | 49.65 | 48.32 | 48.40 | 49.90 | 48.90 |
| $SiO_2 + Al_2O_3 + B_2O_3 + P_2O_5 + 1.5Na_2O + 1.5K_2O + 2SrO + 3BaO + ZnO$ | 74.76 | 74.74 | 74.75 | 74.76 | 76.30 | 76.43 | 76.44 |
| $SiO_2 + Al_2O_3 + B_2O_3 + P_2O_5 + Na_2O + K_2O + CaO + 2SrO + 3BaO$ | 82.54 | 82.34 | 81.85 | 80.54 | 82.10 | 81.23 | 80.24 |
| Tg(° C.) | 692 | 695 | 692 | 691 | 694 | 697 | 696 |
| $\alpha(*10^{-7}/°$ C.) | 50.2 | 49.6 | 48.0 | 47.0 | 47.8 | 47.6 | 45.7 |
| Specific gravity | 2.58 | 2.62 | 2.57 | 2.59 | 2.55 | 2.56 | 2.55 |
| Young's modulus (GPa) | 94.3 | 95.2 | 95.6 | 95.1 | 95.1 | 95.2 | 95.6 |
| Specific elastic modulus (MNm/kg) | 36.5 | 36.3 | 37.1 | 36.7 | 37.3 | 37.3 | 37.5 |
| 1300° C. and 16 hour holding test | A | | A | A | A | A | A |
| 1250° C. and 16 hour holding test | A | C | | | | | |
| Bubble density rank | A | S | S | S | S | S | S |
| Natural log lnρ of specific electrical resistance ρ(1450° C.) | | | | | 2.639 | | 2.001 |

TABLE 9

| No. | 61 | 62 | 63 | 64 | 65 | 66 | 67 | 68 |
|---|---|---|---|---|---|---|---|---|
| $SiO_2$ | 61.51 | 61.64 | 61.60 | 61.60 | 62.60 | 62.60 | 64.00 | 64.00 |
| $Al_2O_3$ | 15.10 | 15.12 | 15.54 | 16.12 | 14.00 | 15.00 | 8.00 | 10.00 |
| $B_2O_3$ | 0.00 | 0.00 | 0.00 | 0.00 | 0.00 | 0.00 | 0.00 | 0.00 |
| MgO | 10.80 | 11.81 | 10.80 | 10.81 | 13.30 | 13.30 | 6.00 | 12.00 |
| CaO | 5.80 | 5.78 | 5.60 | 5.78 | 4.30 | 2.30 | 12.80 | 10.70 |
| SrO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $ZrO_2$ | 0.00 | 0.00 | 0.00 | 0.00 | 0.00 | 0.00 | 3.00 | 0.00 |
| $Li_2O$ | 5.60 | 4.59 | 5.20 | 4.59 | 4.70 | 5.70 | 2.00 | 2.30 |
| $Na_2O$ | 0.00 | 0.00 | 0.00 | 0.00 | 0.00 | 0.00 | 2.50 | 0.70 |
| $K_2O$ | 0.00 | 0.00 | 0.00 | 0.00 | 0.00 | 0.00 | 0.00 | 0.00 |
| $TiO_2$ | 0.76 | 0.76 | 0.76 | 0.76 | 0.76 | 0.76 | 1.50 | 0.00 |
| $Y_2O_3$ | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 |
| $SnO_2$ | 0.30 | 0.10 | 0.30 | 0.21 | 0.21 | 0.21 | 0.10 | 0.20 |
| $CeO_2$ | 0.13 | 0.20 | 0.20 | 0.13 | 0.13 | 0.13 | 0.10 | 0.10 |
| $Sb_2O_3$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |

| No. | 69 | 70 | 71 | 72 | 73 | 74 | 75 | 76 |
|---|---|---|---|---|---|---|---|---|
| $SiO_2$ | 60.59 | 60.59 | 61.60 | 60.60 | 62.60 | 60.00 | 60.60 | 61.60 |
| $Al_2O_3$ | 15.12 | 15.12 | 13.82 | 12.82 | 16.00 | 14.70 | 13.90 | 13.00 |
| $B_2O_3$ | 0.30 | 0.30 | 0.00 | 0.00 | 0.00 | 0.00 | 0.00 | 0.00 |
| MgO | 6.00 | 8.00 | 14.64 | 17.64 | 13.30 | 10.00 | 11.40 | 13.70 |
| CaO | 11.88 | 9.88 | 4.08 | 3.08 | 0.00 | 10.00 | 7.74 | 5.75 |
| SrO | 0.20 | 0.20 | 0.00 | 0.00 | 0.00 | 0.00 | 0.00 | 0 |
| BaO | 0.20 | 0.20 | 0.00 | 0.00 | 0.00 | 0.00 | 0.00 | 0 |
| ZnO | 0.00 | 0.00 | 0.00 | 0.00 | 0.00 | 0.00 | 0.00 | 0.00 |
| $ZrO_2$ | 0.00 | 0.00 | 0.00 | 0.00 | 0.50 | 0.00 | 0.00 | 0.00 |
| $Li_2O$ | 4.60 | 4.60 | 3.80 | 4.80 | 4.50 | 4.80 | 5.00 | 4.59 |
| $Na_2O$ | 0.00 | 0.00 | 1.00 | 0.00 | 2.00 | 0.00 | 0.00 | 0.00 |
| $K_2O$ | 0.00 | 0.00 | 0.00 | 0.00 | 0.00 | 0.00 | 0.00 | 0.00 |
| $TiO_2$ | 0.78 | 0.78 | 0.76 | 0.76 | 0.76 | 0.00 | 0.76 | 0.76 |
| $Y_2O_3$ | 0.00 | 0.00 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 |
| $SnO_2$ | 0.21 | 0.21 | 0.10 | 0.10 | 0.21 | 0.3 | 0.4 | 0.3 |
| $CeO_2$ | 0.12 | 0.12 | 0.20 | 0.20 | 0.13 | 0.2 | 0.2 | 0.3 |
| $Sb_2O_3$ | 0.00 | 0.00 | 0.00 | 0.00 | 0.00 | 0 | 0 | 0 |
| Total | 100.00 | 100.00 | 100.00 | 100.00 | 100.00 | 100.00 | 100.00 | 100.00 |

TABLE 10

| No. | 61 | 62 | 63 | 64 | 65 | 66 | 67 | 68 | 69 |
|---|---|---|---|---|---|---|---|---|---|
| $SiO_2 + Al_2O_3$ | 76.61 | 76.76 | 77.14 | 77.72 | 76.60 | 77.60 | 72.00 | 74.00 | 75.71 |
| MgO + CaO | 16.60 | 17.59 | 16.40 | 16.59 | 17.60 | 15.60 | 18.80 | 22.70 | 17.88 |
| MgO + CaO + SrO + BaO | 16.60 | 17.59 | 16.40 | 16.59 | 17.60 | 15.60 | 18.80 | 22.70 | 18.28 |
| CaO/MgO | 0.537 | 0.489 | 0.519 | 0.535 | 0.323 | 0.173 | 2.133 | 0.892 | 1.980 |
| $Li_2O + Na_2O + K_2O$ | 5.60 | 4.59 | 5.20 | 4.59 | 4.70 | 5.70 | 4.50 | 3.00 | 4.60 |
| $Na_2O/Li_2O$ | 0.00 | 0.00 | 0.00 | 0.00 | 0.00 | 0.00 | 1.25 | 0.30 | 0.00 |
| $(CaO + Na_2O)/(MgO + Li_2O)$ | 0.35 | 0.35 | 0.35 | 0.38 | 0.24 | 0.12 | 1.91 | 0.80 | 1.12 |
| $Li_2O/(MgO + CaO)$ | 0.34 | 0.26 | 0.32 | 0.28 | 0.27 | 0.37 | 0.11 | 0.10 | 0.26 |
| $4Li_2O + 2Na_2O + K_2O$ | 22.40 | 18.36 | 20.80 | 18.36 | 18.80 | 22.80 | 13.00 | 10.60 | 18.40 |
| $SiO_2/(Li_2O + Na_2O + K_2O)$ | 10.98 | 13.43 | 11.85 | 13.42 | 13.32 | 10.98 | 14.22 | 21.33 | 13.17 |
| $(SiO_2 + ZrO_2)/Al_2O_3$ | 4.07 | 4.08 | 3.96 | 3.82 | 4.47 | 4.17 | 8.38 | 6.40 | 4.01 |
| $Li_2O/(Li_2O + Na_2O + K_2O)$ | 1.00 | 1.00 | 1.00 | 1.00 | 1.00 | 1.00 | 0.44 | 0.77 | 1.00 |
| $Na_2O/(Li_2O + Na_2O + K_2O)$ | 0.00 | 0.00 | 0.00 | 0.00 | 0.00 | 0.00 | 0.56 | 0.23 | 0.00 |
| $SnO_2 + CeO_2$ | 0.43 | 0.30 | 0.50 | 0.34 | 0.34 | 0.34 | 0.20 | 0.30 | 0.33 |
| $SnO_2/CeO_2$ | 2.31 | 0.50 | 1.50 | 1.62 | 1.62 | 1.62 | 1.00 | 2.00 | 1.75 |
| $(TiO_2 + Al_2O_3)/(MgO + CaO)$ | 0.955 | 0.903 | 0.994 | 1.017 | 0.839 | 1.010 | 0.505 | 0.441 | 0.889 |
| $(MgO + CaO)/(MgO + CaO + SrO + BaO)$ | 1.000 | 1.000 | 1.000 | 1.000 | 1.000 | 1.000 | 1.000 | 1.000 | 0.978 |
| $MgO/(MgO + CaO + SrO + BaO)$ | 0.65 | 0.67 | 0.66 | 0.65 | 0.76 | 0.85 | 0.32 | 0.53 | 0.33 |
| $BaO/(MgO + CaO + SrO + BaO)$ | 0.00 | 0.00 | 0.00 | 0.00 | 0.00 | 0.00 | 0.00 | 0.00 | 0.01 |
| $MgO + 0.7CaO + Li_2O + TiO_2 + ZrO_2$ | 21.22 | 21.21 | 20.68 | 20.21 | 21.77 | 21.37 | 21.46 | 21.79 | 19.70 |
| $P_2O_5/(B_2O_3 + SiO_2 + Al_2O_3 + P_2O_5)$ | 0.000 | 0.000 | 0.000 | 0.000 | 0.000 | 0.000 | 0.000 | 0.000 | 0.000 |
| $5Li_2O + 3Na_2O + 3K_2O + 2B_2O_3 + MgO + 2CaO + 3SrO + BaO$ | 50.40 | 46.32 | 48.00 | 45.32 | 45.40 | 46.40 | 49.10 | 47.00 | 54.16 |
| $SiO_2 + Al_2O_3 + B_2O_3 + P_2O_5 + 1.5Na_2O + 1.5K_2O + 2SrO + 3BaO + ZnO$ | 76.61 | 76.76 | 77.14 | 77.72 | 76.60 | 77.60 | 75.75 | 75.05 | 77.01 |
| $SiO_2 + Al_2O_3 + B_2O_3 + P_2O_5 + Na_2O + K_2O + CaO + 2SrO + 3BaO$ | 82.41 | 82.54 | 82.74 | 83.50 | 80.90 | 79.90 | 87.30 | 85.40 | 88.89 |

TABLE 10-continued

| | | | | | | | | | |
|---|---|---|---|---|---|---|---|---|---|
| Tg(° C.) | 696 | 704 | 704 | 717 | 705 | 685 | 691 | 736 | 689 |
| α(*10$^{-7}$/° C.) | 47.7 | 45.6 | 46.5 | 45.4 | 44.8 | 44.9 | 61.5 | 47.5 | 47.5 |
| Specific gravity | 2.55 | 2.56 | 2.55 | 2.56 | 2.55 | 2.53 | 2.65 | 2.58 | 2.57 |
| Young's modulus (GPa) | 94.6 | 95.5 | 94.9 | 95.5 | 95 | 94.9 | 91 | 91 | 92.8 |
| Specific elastic modulus (MNm/kg) | 37.1 | 37.3 | 37.3 | 37.4 | 37.3 | 37.5 | 34.3 | 35.3 | 36.1 |
| 1300° C. and 16 hour holding test | A | A | A | A | A | | A | A | A |
| 1250° C. and 16 hour holding test | | | | | | | | A | A |
| Bubble density rank | S | A | S | S | S | S | B | A | S |
| Natural log lnp of specific electrical resistance ρ(1450° C.) | | | | | | 1.988 | | | |

| No. | 70 | 71 | 72 | 73 | 74 | 75 | 76 |
|---|---|---|---|---|---|---|---|
| SiO$_2$ + Al$_2$O$_3$ | 75.71 | 75.42 | 73.42 | 78.60 | 74.70 | 74.50 | 74.60 |
| MgO + CaO | 17.88 | 18.72 | 20.72 | 13.30 | 20.00 | 19.14 | 19.45 |
| MgO + CaO + SrO + BaO | 18.28 | 18.72 | 20.72 | 13.30 | 20.00 | 19.14 | 19.45 |
| CaO/MgO | 1.235 | 0.279 | 0.175 | 0.000 | 1.000 | 0.679 | 0.420 |
| Li$_2$O + Na$_2$O + K$_2$O | 4.60 | 4.80 | 4.80 | 6.50 | 4.80 | 5.00 | 4.59 |
| Na$_2$O/Li$_2$O | 0.00 | 0.26 | 0.00 | 0.44 | 0.00 | 0.00 | 0.00 |
| (CaO + Na$_2$O)/(MgO + Li$_2$O) | 0.78 | 0.28 | 0.14 | 0.11 | 0.68 | 0.47 | 0.31 |
| Li$_2$O/(MgO + CaO) | 0.26 | 0.20 | 0.23 | 0.34 | 0.24 | 0.26 | 0.24 |
| 4Li$_2$O + 2Na$_2$O + K$_2$O | 18.40 | 17.20 | 19.20 | 22.00 | 19.20 | 20.00 | 18.36 |
| SiO$_2$/(Li$_2$O + Na$_2$O + K$_2$O) | 13.17 | 12.83 | 12.63 | 9.63 | 12.50 | 12.12 | 13.42 |
| (SiO$_2$ + ZrO$_2$)/Al$_2$O$_3$ | 4.01 | 4.46 | 4.73 | 3.94 | 4.08 | 4.36 | 4.74 |
| Li$_2$O/(Li$_2$O + Na$_2$O + K$_2$O) | 1.00 | 0.79 | 1.00 | 0.69 | 1.00 | 1.00 | 1.00 |
| Na$_2$O/(Li$_2$O + Na$_2$O + K$_2$O) | 0.00 | 0.21 | 0.00 | 0.31 | 0.00 | 0.00 | 0.00 |
| SnO$_2$ + CeO$_2$ | 0.33 | 0.30 | 0.30 | 0.34 | 0.50 | 0.60 | 0.60 |
| SnO$_2$/CeO$_2$ | 1.75 | 0.50 | 0.50 | 1.62 | 1.50 | 2.00 | 1.00 |
| (TiO$_2$ + Al$_2$O$_3$)/(MgO + CaO) | 0.889 | 0.779 | 0.655 | 1.260 | 0.735 | 0.766 | 0.707 |
| (MgO + CaO)/(MgO + CaO + SrO + BaO) | 0.978 | 1.000 | 1.000 | 1.000 | 1.000 | 1.000 | 1.000 |
| MgO/(MgO + CaO + SrO + BaO) | 0.44 | 0.78 | 0.85 | 1.00 | 0.50 | 0.60 | 0.70 |
| BaO/(MgO + CaO + SrO + BaO) | 0.01 | 0.00 | 0.00 | 0.00 | 0.00 | 0.00 | 0.00 |
| MgO + 0.7CaO + Li$_2$O + TiO$_2$ + ZrO$_2$ | 20.30 | 22.06 | 25.36 | 19.06 | 21.80 | 22.58 | 23.08 |
| P$_2$O$_5$/(B$_2$O$_3$ + SiO$_2$ + Al$_2$O$_3$ + P$_2$O$_5$) | 0.000 | 0.000 | 0.000 | 0.000 | 0.000 | 0.000 | 0.000 |
| 5Li$_2$O + 3Na$_2$O + 3K$_2$O + 2B$_2$O$_3$ + MgO + 2CaO + 3SrO + BaO | 52.16 | 44.80 | 47.80 | 41.80 | 54.00 | 51.88 | 48.15 |
| SiO$_2$ + Al$_2$O$_3$ + B$_2$O$_3$ + P$_2$O$_5$ + 1.5Na$_2$O + 1.5K$_2$O + 2SrO + 3BaO + ZnO | 77.01 | 76.92 | 73.42 | 81.60 | 74.70 | 74.50 | 74.60 |
| SiO$_2$ + Al$_2$O$_3$ + B$_2$O$_3$ + P$_2$O$_5$ + Na$_2$O + K$_2$O + CaO + 2SrO + 3BaO | 86.89 | 80.50 | 76.50 | 80.60 | 84.70 | 82.24 | 80.35 |
| Tg(° C.) | 691 | 705 | 690 | 685 | 691 | 690 | 691 |
| α(*10$^{-7}$/° C.) | 48.0 | 47.8 | 50.5 | 46.3 | 50.6 | 50.2 | 47.0 |
| Specific gravity | 2.59 | 2.54 | 2.58 | 2.53 | 2.58 | 2.58 | 2.57 |
| Young's modulus (GPa) | 92.8 | 95.9 | 96.8 | 93.5 | 94.6 | 96.2 | 95.9 |
| Specific elastic modulus (MNm/kg) | 35.8 | 37.8 | 37.5 | 37.0 | 36.6 | 37.3 | 37.3 |
| 1300° C. and 16 hour holding test | A | A | A | A | A | A | A |
| 1250° C. and 16 hour holding test | A | A | A | A | A | | |
| Bubble density rank | S | A | A | S | S | S | S |
| Natural log lnp of specific electrical resistance ρ(1450° C.) | | | | | | | |

From the results shown in the tables above, it was confirmed that each glass for a magnetic recording medium substrate of Examples had high heat resistance and rigidity. Also, it was confirmed that each glass for a magnetic recording medium substrate of Examples had a low specific gravity and a suitable thermal expansion coefficient.

A glass, which represents a better evaluation result at a lower temperature in the holding test related to glass stability to be performed according to the above-described method, is a glass less likely to cause crystals to precipitate in a molten state, and can be molded under lowered molding temperatures. A more lowered temperature can extend lifetimes of constituent members of a molding apparatus, such as an exothermic body, a furnace body, and a pipe. In particular, in a case where a substrate blank is to be produced through press molding, a lower molding temperature is preferable. Also, if a molding temperature can be lowered, molding can be performed under an increased glass viscosity, and thus it is possible to inhibit volatilization and the generation of striae and molding bubbles.

It was also confirmed that each of glasses in Examples shown in the tables above had an S-, A- or B-rank in bubble density, and that the generation of bubbles was inhibited.

[Production of Magnetic Recording Medium Substrate]
(1) Production of Substrate Blank Next, a disk-shaped substrate blank was produced using a method A or B below. It is also possible to obtain a glass blank for producing a glass spacer for a magnetic recording and reproducing apparatus, using the same method.

(Method A)

A clarified and homogenized molten glass of the above-described Example was flowed out at a constant flow rate from an outflow pipe and was received with a lower die for press molding, and the molten glass having been flowed out was cut with a cutting blade so that a predetermined amount of molten glass lump was able to be obtained on the lower die. Then, the lower die holding the molten glass lump was immediately taken out from the lower position of the pipe and was press-molded into a thin-walled disk shape having a diameter of 66 mm and a thickness of 1.2 mm, through the use of an upper die facing the lower die and a drum die. The press-molded product was cooled to temperatures not causing the product to change shape, and then it was taken out from the die and annealed to give a substrate blank. Note that, in the above-described molding, a plurality of lower dies were used for molding the molten glass having been flowed out into disk-shaped substrate blanks one after another.
(Method B)

A clarified and homogenized molten glass of the above-described Example was continuously cast from above into a heat resistant mold provided with a tubular through hole via the through hole, and the molten glass was then molded into a round column and was taken out from the lower side of the through hole. The taken-out glass was annealed and was then sliced at fixed intervals in the direction perpendicular to the round columnar axis through the use of a multi wire saw to thereby produce disk-shaped substrate blanks.

Note that, although the above-described methods A and B were employed in this example, methods C and D below are also suitable as a method for manufacturing a disk-shaped substrate blank. Also, methods C and D below are also suitable as a method for manufacturing a glass blank for producing a glass spacer for a magnetic recording and reproducing apparatus.
(Method C)

It is also possible to obtain a substrate blank by: allowing the molten glass of the above-described Example to flow out onto a float bath; molding the same into a sheet-shaped glass (molding by a float method); subsequently annealing the same; and then boring a disk-shaped glass from the sheet glass.
(Method D)

It is also possible to obtain a substrate blank by: molding the molten glass of the above-described Example into a sheet-shaped glass, using an overflow down-draw method (fusion method); annealing the same; and then boring a disk-shaped glass from the sheet glass.

(2) Production of Glass Substrate

A through hole was bored in the center of the substrate blank obtained using each of the above-described methods, and then grinding processing was then performed on an outer circumferential surface and an inner circumferential surface of the resulting substrate blank. Then, the main surface of the disk was subjected to lapping and polishing (mirror polishing processing) and thereby the disk was finished into a glass substrate for a magnetic disk, having a diameter of 65 mm and a thickness of 0.8 mm. It is also possible to finish a glass blank for producing a glass spacer for a magnetic recording and reproducing apparatus into a glass spacer for a magnetic recording and reproducing apparatus, using the same method.

The glass substrate obtained in the above was cleaned through the use of a 1.7 mass % aqueous solution of hydrofluorosilicic acid ($H_2SiF$), subsequently through the use of a 1 mass % aqueous solution of potassium hydroxide, and the glass substrate was then rinsed with pure water and dried. In magnification observation of the surface of the substrate produced from the glass in Example, surface roughness and the like were not recognized and the surface was smooth.

[Production of Magnetic Recording Medium (Magnetic Disk)]

Using the following methods, an adhesive layer, an undercoat layer, a magnetic recording layer, a protecting layer, and a lubricating layer were formed in that order on the main surface of a glass substrate obtained from the glass in Example to thereby obtain a magnetic disk.

First, through the use of an evacuated film formation apparatus, an adhesive layer, an undercoat layer, and a magnetic recording layer were sequentially formed using a DC magnetron sputtering method in an Ar atmosphere.

At this time, the adhesive layer was formed through the use of a CrTi target so as to give an amorphous CrTi layer having a thickness of 20 nm. Furthermore, a layer that was comprised of MgO and had a thickness of 10 nm was formed as an undercoat layer. Furthermore, a magnetic recording layer was formed at a film formation temperature of 200° C. to 400° C. through the use of an FePtC or CoPtC target so as to give an FePt granular layer or a CoPt granular layer having a thickness of 10 nm.

A magnetic disk, in which film formation up to the magnetic recording layer had been finished, was moved from the film formation apparatus into a heating furnace to thereby be subjected to annealing. The temperature in the heating furnace in annealing was set in a range of 500° C. to 700° C. Magnetic particles made of a CoPt-based alloy or an FePt-based alloy having an $L_{10}$ ordered structure were formed through this annealing process. Note that there is no limitation thereto, and heating need only be performed to realize an $L_{10}$ ordered structure.

Then, a 3 nm protecting layer comprised of hydrogenated carbon was formed using a CVD method using ethylene as material gas. After that, a lubricating layer was formed using PFPE (perfluoropolyether) and using a dip coating method. The thickness of the lubricating layer was 1 nm.

A magnetic disk was obtained by the above-described manufacturing process. The obtained magnetic disk was mounted on a hard disk drive provided with a DFH mechanism and magnetic signals were recorded with a recording density of 1000 gigabits per 1 square inch in a recording region on the main surface of the magnetic disk, and were reproduced. At this time, a phenomenon (crash failure), in which a magnetic head and a magnetic disk surface collide with each other, was not confirmed.

Also, a glass spacer obtained by forming an NiP alloy-conductive film on a surface of the glass spacer obtained through the above-described manufacturing process with the use of glass of Example (a glass spacer provided with an NiP-alloy film) was mounted on a hard disk drive provided with a DFH mechanism, and magnetic signals were recorded with a recording density of 1000 gigabits per 1 square inch in a recording region on the main surface of a magnetic disk, which was separately prepared using a substrate made of a material that is different from that of glass (Glass A or Glass B) according to an aspect of the present invention, and were reproduced. At this time, a phenomenon (crash failure), in which a magnetic head and a magnetic disk surface collide with each other, was not confirmed.

Also, the magnetic disk that was manufactured above and the glass spacer provided with the NiP-alloy film that was manufactured above, using the same glass material according an aspect of the present invention were mounted on a hard disk drive provided with a DFH mechanism, and magnetic signals were recorded with a recording density of 1000 gigabits per 1 square inch in a recording region on the main surface of the magnetic disk, and were reproduced. At this time, a phenomenon (crash failure), in which a magnetic head and a magnetic disk surface collide with each other, was not confirmed. Here, the glass substrate included in the above-described magnetic disk and the above-described glass spacer were comprised of the same glass material, and thus it is clear that phenomena that may occur due to the above-described difference in the thermal expansion coefficient do not occur.

According to an aspect of the present invention, it is possible to provide a magnetic recording medium suitable for high-density recording.

Finally, the aforementioned respective aspects are summarized.

In an aspect, provided is a glass for a magnetic recording medium substrate, which is an amorphous oxide glass, wherein an $SiO_2$ content ranges from 56 mol % to 80 mol %, an $Li_2O$ content ranges from 1 mol % to 10 mol %, a $B_2O_3$ content ranges from 0 mol % to 4 mol %, a total content of MgO and CaO (MgO+CaO) ranges from 9 mol % to 40 mol %, and the oxide glass has a specific gravity of 2.75 g/cm$^3$ or less, a glass transition temperature of 650° C. or higher, and a Young's modulus of 90 GPa or more; and a glass for a magnetic recording medium substrate, which is an amorphous oxide glass, wherein an $SiO_2$ content ranges from 56 mol % to 80 mol %, an $Li_2O$ content ranges from 1 mol % to 10 mol %, a $B_2O_3$ content ranges from 0 mol % to 4 mol %, a total content of MgO and CaO (MgO+CaO) ranges from 9 mol % to 40 mol %, a mole ratio of a total content of $SiO_2$ and $ZrO_2$ relative to an $Al_2O_3$ content (($SiO_2+ZrO_2$)/$Al_2O_3$) ranges from 2 to 13, and the oxide glass has a glass transition temperature of 650° C. or higher, and a Young's modulus of 90 GPa or more.

Also, in an aspect, provided is a glass spacer for a magnetic recording and reproducing apparatus, the glass spacer containing an amorphous oxide glass, wherein an $SiO_2$ content ranges from 56 mol % to 80 mol %, an $Li_2O$ content ranges from 1 mol % to 10 mol %, a $B_2O_3$ content ranges from 0 mol % to 4 mol %, a total content of MgO and CaO (MgO+CaO) ranges from 9 mol % to 40 mol %, and the oxide glass has a specific gravity of 2.75 g/cm$^3$ or less, a glass transition temperature of 650° C. or higher, and a Young's modulus of 90 GPa or more; and a glass spacer for a magnetic recording and reproducing apparatus, the glass spacer containing an amorphous oxide glass, wherein an $SiO_2$ content ranges from 56 mol % to 80 mol %, an $Li_2O$ content ranges from 1 mol % to 10 mol %, a $B_2O_3$ content ranges from 0 mol % to 7 mol %, a total content of MgO and CaO (MgO+CaO) ranges from 9 mol % to 40 mol %, a mole ratio of a total content of $SiO_2$ and $ZrO_2$ relative to an $Al_2O_3$ content (($SiO_2+ZrO_2$)/$Al_2O_3$) ranges from 2 to 13, and the oxide glass has a glass transition temperature of 650° C. or higher, and a Young's modulus of 90 GPa or more.

The above-described glass for a magnetic recording medium substrate has high heat resistance and rigidity. The same applies to the above-described glass spacer for a magnetic recording and reproducing apparatus.

In an embodiment, in the above-described oxide glass, an average linear expansion coefficient at 100° C. to 300° C. may be in a range of $40\times10^{-7}$/° C. to $70\times10^{-7}$/° C.

In an embodiment, a CaO content of the above-described oxide glass may be in a range of 0 mol % to 18 mol %.

In an embodiment, a total content of BaO and SrO in the above-described oxide glass may be in a range of 0 mol % to 2 mol %.

In an embodiment, a total content of $Li_2O$, $Na_2O$, and $K_2O$ ($Li_2O+Na_2O+K_2O$) in the above-described oxide glass may be in a range of 2.5 mol % to 10 mol %.

In an embodiment, a total content of $SnO_2$ and $CeO_2$ ($SnO_2+CeO_2$) in the above-described oxide glass may be in a range of 0.05 mol % to 2 mol %.

In an embodiment, a mole ratio of an $SnO_2$ content relative to a $CeO_2$ content ($SnO_2/CeO_2$) in the above-described oxide glass may be equal to or more than 1.

In an embodiment, the above-described oxide glass contains $SiO_2$ in an amount of 56 mol % to 65 mol %, $Al_2O_3$ in an amount of 5 mol % to 20 mol %, $B_2O_3$ in an amount of 0 mol % to 4 mol %, MgO in an amount of 3 mol % to 28 mol %, and $Li_2O$ in an amount of 1 mol % to 10 mol %, wherein a total content of $SiO_2$ and $Al_2O_3$ ($SiO_2+Al_2O_3$) ranges from 65 mol % to 80 mol %, a total content of MgO and CaO (MgO+CaO) ranges from 11 mol % to 30 mol %, a total content of MgO, CaO, Sr), and BaO (MgO+CaO+SrO+BaO) ranges from 12 mol % to 30 mol %, a sum of the MgO content, 0.7×the CaO content, the $Li_2O$ content, the $TiO_2$ content, and the $ZrO_2$ content (MgO+0.7CaO+$Li_2O$+$TiO_2$+$ZrO_2$) is equal to or more than 16 mol %, a sum of 5×the $Li_2O$ content, 3×the $Na_2O$ content, 3×the $K_2O$ content, 2×the $B_2O_3$ content, the MgO content, 2×the CaO content, 3×the Sr) content, and the BaO content (5$Li_2O$+3$Na_2O$+3$K_2O$+2$B_2O_3$+MgO+2CaO+3Sr)+BaO) ranges from 32 mol % to 58 mol %, a sum of the $SiO_2$ content, the $Al_2O_3$ content, the $B_2O_3$, the $P_2O_5$ content, 1.5×the $Na_2O$ content, 1.5×the $K_2O$ content, 2×the SrO content, 3×the BaO content, and the ZnO content ($SiO_2+Al_2O_3+B_2O_3+P_2O_5+1.5Na_2O+1.5K_2O+2SrO+3BaO+ZnO$) is equal to or less than 86 mol %, a sum of the $SiO_2$ content, the $Al_2O_3$ content, the $B_2O_3$ content, the $P_2O_5$ content, the $Na_2O$ content, the $K_2O$ content, the CaO content, 2×the SrO content, and 3×the BaO content ($SiO_2+Al_2O_3+B_2O_3+P_2O_5+Na_2O+K_2O+CaO+2SrO+3BaO$) is equal to less than 92 mol %, a mole ratio of the CaO content relative to the MgO content (CaO/MgO) is equal to or less than 2.5, a mole ratio of the $Na_2O$ content relative to the $Li_2O$ content ($Na_2O$/$Li_2O$) is equal to or less than 5, a mole ratio of the $Li_2O$ content relative to the total content of MgO and CaO ($Li_2O$/(MgO+CaO)) ranges from 0.03 to 0.4, a mole ratio of the $SiO_2$ content relative to the total content of $Li_2O$, $Na_2O$, and $K_2O$ ($SiO_2$/($Li_2O+Na_2O+K_2O$)) ranges from 4 to 22, a mole ratio of the total content of $SiO_2$ and $ZrO_2$ relative to the $Al_1O_3$ content ranges from 2 to 10, a mole ratio of the total content of $TiO_2$ and $Al_2O_3$ relative to the total content of MgO and CaO (($TiO_2+Al_2O_3$)/(MgO+CaO)) ranges from 0.35 to 2, a mole ratio of the total content of MgO and CaO relative to the total content of MgO, CaO, SrO, and BaO ((MgO+CaO)/(MgO+CaO+SrO+BaO)) ranges from 0.7 to 1, a mole ratio of the BaO content relative to the total content of MgO, CaO, SrO, and BaO (BaO/(MgO+CaO+SrO+BaO)) is equal to or less than 0.1, and a mole ratio of the $P_2O_5$ content relative to the total content of $B_2O_3$, $SiO_2$, $Al_2O_3$, and $P_2O_5$, ($P_2O_5$/($B_2O_3+SiO_2+Al_2O_3+P_2O_5$)) is equal to or less than 0.005.

In an aspect, provided is a magnetic recording medium substrate comprised of the above-described glass for a magnetic recording medium substrate.

In an aspect, in the above-described magnetic recording medium substrate, the surface composition and internal composition thereof are homogeneous.

According to an aspect, provided is a magnetic recording medium having a magnetic recording layer on the above-described magnetic recording medium substrate.

According to an aspect, provided is a magnetic recording and reproducing apparatus that includes at least one of the above-described magnetic recording medium and the above-described glass spacer for a magnetic recording and reproducing apparatus.

An aspect of the present invention relates to a glass for a magnetic recording medium substrate (hereinafter, also simply referred to as "Glass A"), which is an amorphous oxide glass, wherein an $SiO_2$ content ranges from 56 mol % to 80 mol %;
an $Li_2O$ content ranges from 1 mol % to 10 mol %;
a $B_2O_3$ content ranges from 0 mol % to 4 mol %;
a total content of MgO and CaO (MgO+CaO) ranges from 9 mol % to 40 mol %; and
the oxide glass has a specific gravity of 2.75 g/cm³ or less, a glass transition temperature of 650° C. or higher, and a Young's modulus of 90 CPa or more.

Also, an aspect of the present invention relates to a glass for a magnetic recording medium substrate (hereinafter, also simply referred to as "Glass B"), which is an amorphous oxide glass, wherein an $SiO_2$ content, ranges from 56 mol % to 80 mol %;
an $Li_2O$ content ranges from 1 mol % to 10 mol %;
a $B_2O_3$ content ranges from 0 mol % to 4 mol %;
a total content of MgO and CaO (MgO+CaO) ranges from 9 mol % to 40 mol %;
a mole ratio of a total content of $SiO_2$ and $ZrO_2$ relative to an $Al_2O_3$ content (($SiO_2$+$ZrO_2$)/$Al_2O_3$) ranges from 2 to 13; and
the oxide glass has a glass transition temperature of 650° C. or higher, and a Young's modulus of 90 GPa or more.

Glass A and Glass B have the above-described glass compositions, and have high heat resistance such that the glass transition temperature is equal to or higher than 650° C., and high rigidity such that the Young's modulus is equal to or more than 90 GPa.

According to an aspect of the present invention, it is possible to provide a glass for a magnetic recording medium substrate with high heat resistance and rigidity. Furthermore, according to an aspect, it is also possible to provide a magnetic recording medium substrate comprised of the above-described glass for a magnetic recording medium substrate, and a magnetic recording medium that includes the above-described substrate. In addition, according to an aspect, it is possible to provide a glass spacer for a magnetic recording apparatus.

It should be considered that all the embodiments disclosed this time are exemplifications in all respects and are not restrictive ones. It is intended that the scope of the present invention is shown not by the above explanations but by the claims, and that all changes in equivalent meanings and ranges to the scope of the claims are included.

Bly subjecting the glass composition exemplified above to the composition adjustment described in this specification, a glass for a magnetic recording medium substrate and a glass spacer for a magnetic recording and reproducing apparatus according to respective aspects of the present invention can be produced, for example.

Furthermore, it is possible, needless to say, to combine arbitrarily equal to or more than 2 items exemplified or described as preferable ranges in the specification.

What is claimed is:

1. A glass,
which is a glass for a magnetic recording medium substrate or for a glass spacer for a magnetic recording and reproducing apparatus,
which is an amorphous oxide glass,
wherein an $SiO_2$ content ranges from 56 mol % to 80 mol %;
an $Li_2O$ content ranges from 1 mol % to 10 mol %;
a $B_2O_3$ content ranges from 0 mol % to 4 mol %;
a $Na_2O$ content is 0 mol %;
a total content of MgO and CaO (MgO+CaO) ranges from 9 mol % to 40 mol %; and
the oxide glass has a specific gravity of 2.75 g/cm³ or less, a glass transition temperature of 650° C. or higher, and a Young's modulus of 90 GPa or more.

2. A glass,
which is a glass for a magnetic recording medium substrate or for a glass spacer for a magnetic recording and reproducing apparatus,
which is an amorphous oxide glass,
wherein an $SiO_2$ content ranges from 56 mol % to 80 mol %;
an $Li_2O$ content is equal to or less than 10 mol %;
a $B_2O_3$ content ranges from 0 mol % to 4 mol %;
a CaO content is 0 mol %;
a total content of MgO and CaO (MgO+CaO) ranges from 9 mol % to 40 mol %; and
the oxide glass has a specific gravity of 2.75 g/cm³ or less, a glass transition temperature of 650° C. or higher, and a Young's modulus of 90 GPa or more.

3. The glass according to claim 1,
wherein a total content of $Li_2O$, $Na_2O$, and $K_2O$ ($Li_2O$+$Na_2O$+$K_2O$) ranges from 2.5 mol % to 10 mol %.

4. The glass according to claim 2,
wherein a total content of $Li_2O$, $Na_2O$, and $K_2O$ ($Li_2O$+$Na_2O$+$K_2O$) ranges from 2.5 mol % to 10 mol %.

5. The glass according to claim 1,
wherein a total content of BaO and SrO ranges from 0 mol % to 2 mol %.

6. The glass according to claim 2,
wherein a total content of BaO and SrO ranges from 0 mol % to 2 mol %.

7. The glass according to claim 3,
wherein a total content of BaO and SrO ranges from 0 mol % to 2 mol %.

8. The glass according to claim 4,
wherein a total content of BaO and SrO ranges from 0 mol % to 2 mol %.

9. The glass according to claim 1,
wherein an average linear expansion coefficient at 100° C. to 300° C. ranges from $40 \times 10^{-7}$ to $70 \times 10^{-7}$/° C.

10. The glass according to claim 2,
wherein an average linear expansion coefficient at 100° C. to 300° C. ranges from $40 \times 10^{-7}$ to $70 \times 10^{-7}$/° C.

11. The glass according to claim 3,
wherein an average linear expansion coefficient at 100° C. to 300° C. ranges from $40 \times 10^{-7}$ to $70 \times 10^{-7}$/° C.

12. The glass according to claim 4,
wherein an average linear expansion coefficient at 100° C. to 300° C. ranges from $40 \times 10^{-7}$ to $70 \times 10^{-7}$/° C.

13. The glass according to claim 5,
wherein an average linear expansion coefficient at 100° C. to 300° C. ranges from $40 \times 10^{-7}$ to $70 \times 10^{-7}$/° C.

14. The glass according to claim 6,
wherein an average linear expansion coefficient at 100° C. to 300° C. ranges from $40 \times 10^{-7}$ to $70 \times 10^{-7}$/° C.

15. The glass according to claim 7,
wherein an average linear expansion coefficient at 100° C. to 300° C. ranges from $40 \times 10^{-7}$ to $70 \times 10^{-7}$/° C.

16. The glass according to claim 8,
wherein an average linear expansion coefficient at 100° C. to 300° C. ranges from $40 \times 10^{-7}$ to $70 \times 10^{-7}$/° C.

17. The glass according to claim 1,
wherein a CaO content ranges from 0 mol % to 18 mol %.

18. The glass according to claim 3,
wherein a CaO content ranges from 0 mol % to 18 mol %.
19. The glass according to claim 5,
wherein a CaO content ranges from 0 mol % to 18 mol %.
20. The glass according to claim 7,
wherein a CaO content ranges from 0 mol % to 18 mol %.

\* \* \* \* \*